United States Patent
Duan et al.

(10) Patent No.: US 11,374,725 B2
(45) Date of Patent: Jun. 28, 2022

(54) MULTIPLE POWER REFERENCES FOR HIGH RANK TRANSMISSIONS

(71) Applicant: QUALCOMM Incorporated, San Diego, CA (US)

(72) Inventors: Weimin Duan, San Diego, CA (US); Alexandros Manolakos, San Diego, CA (US); Muhammad Sayed Khairy Abdelghaffar, San Jose, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/874,642

(22) Filed: May 14, 2020

(65) Prior Publication Data

US 2020/0374096 A1    Nov. 26, 2020

(30) Foreign Application Priority Data

May 21, 2019   (GR) ............................... 20190100224

(51) Int. Cl.
*H04L 5/10* (2006.01)
*H04W 76/27* (2018.01)
(Continued)

(52) U.S. Cl.
CPC ................. *H04L 5/10* (2013.01); *H04B 7/01* (2013.01); *H04L 5/005* (2013.01); *H04W 72/042* (2013.01); *H04W 76/27* (2018.02)

(58) Field of Classification Search
None
See application file for complete search history.

(56) References Cited

U.S. PATENT DOCUMENTS

2015/0124691 A1* 5/2015 Li ..................... H04B 7/0854
                                                      370/312
2018/0375626 A1* 12/2018 Kim ..................... H04L 27/34
(Continued)

FOREIGN PATENT DOCUMENTS

WO   WO-2018064313 A1   4/2018
WO   WO-2018124028 A1   7/2018

OTHER PUBLICATIONS

International Search Report and Written Opinion—PCT/US2020/033075—ISA/EPO—dated Aug. 19, 2020.
(Continued)

*Primary Examiner* — Diane L Lo
(74) *Attorney, Agent, or Firm* — Holland & Hart LLP

(57) ABSTRACT

Methods, systems, and devices for wireless communications are described. A user equipment (UE) may be configured to estimate a signal-to-noise ratio for each antenna port associated with a reception of one or more tracking reference signals. The UE may receive one or more of multiple single-port tracking reference signals, a single multi-port tracking reference signal, or a tracking reference signal associated with multiple power ratios. The UE may be able to estimate a channel upon receiving a demodulation reference signal. The channel estimation may be based on the reception of one or more of multiple single-port tracking reference signals, the single multi-port tracking reference signal, or the tracking reference signal associated with multiple power ratios. The UE may communicate with the base station based on estimating the channel.

30 Claims, 20 Drawing Sheets

(51) Int. Cl.
    *H04B 7/01*     (2006.01)
    *H04L 5/00*     (2006.01)
    *H04W 72/04*     (2009.01)

(56) References Cited

U.S. PATENT DOCUMENTS

2019/0327762 A1    10/2019   Takeda et al.
2021/0045071 A1*   2/2021   Maki .................... H04B 7/0426

OTHER PUBLICATIONS

Nokia: "CR to 38.214 capturing the RAN1#92bis meeting agreements", 3GPP Draft, 3GPP TSG-RAN1 Meeting #92bis, R1-1805796, 3rd Generation Partnership Project (3GPP), Mobile Competence Centre, 650, Route Des Lucioles, F-06921 Sophia-Antipolis Cedex, France, vol. RAN WG1 , No. Sanya, P.R. China, Apr. 16, 2018-Apr. 20, 2018 May 4, 2018 (May 4, 2018), XP051461509, 83 Pages, Retrieved from the Internet: URL:http://www.3gpp.org/ftp/tsg%5Fran/WG1%5FRL1/TSGR1%5F92b/Docs [retrieved on May 4, 2018], section 4.1, section 5.1.4, section 5.1.5.

\* cited by examiner

MULTIPLE POWER REFERENCES FOR HIGH RANK TRANSMISSIONS

CROSS REFERENCE

The present Application for Patent claims the benefit of Greece Provisional Patent Application No. 20190100224 by Duan et al., entitled "MULTIPLE POWER REFERENCES FOR HIGH RANK TRANSMISSIONS," filed May 21, 2019, assigned to the assignee hereof, and expressly incorporated by reference in its entirety herein.

TECHNICAL FIELD

The following relates generally to wireless communications, and more specifically to multiple power references for high rank transmissions.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a base station may communicate with a UE using multiple antennas. Data streams may be mapped to one or more antennas using antenna ports, and these antenna ports may be associated with a reference signal. Such a reference signal may allow a receiver to distinguish data streams associated with different antenna ports in a received transmission. In some examples, one or more antenna ports may be referred to as quasi co-located. For example, the term quasi co-located may be applied when the properties of a channel (such as spatial receive properties) over which a symbol is conveyed on one antenna port may be inferred based on the properties of a channel over which another symbol is conveyed on another antenna port. This implicit relationship between co-located antenna ports may improve the chances that a UE is able to successfully decode a downlink transmission sent via the antenna ports. Transmissions communicated on a number may be referred to as high rank transmissions. However, current techniques for performing receiver processing for high rank transmissions) may, in some instances, be deficient.

SUMMARY

The described techniques relate to improved methods, systems, devices, and apparatuses that support multiple power references for high rank transmissions. A user equipment (UE) in a wireless communications system, such as a New Radio (NR) system or a Long Term Evolution (LTE) system, for example, that supports massive multiple input/multiple output (MIMO) operations using high rank transmissions, may perform time and frequency tracking using reference signals transmitted by a base station. The UE may use a set of antenna ports to receive the reference signals, which may include, for example, tracking reference signals and demodulation reference signals. The UE may receive a power ratio value from the base station, which, for example, may be a ratio between a power associated with a downlink channel and an energy of each resource element of the tracking reference signal (for example, a power reference). In some implementations, the UE may perform a channel estimation for demodulating data or control information received on a first set of antenna ports based on reference signals (for example, demodulation reference signals) received on a second set of antenna ports that are quasi co-located with the first set of antenna ports. In some aspects of the present disclosure, a UE may be associated with a high rank (for example, a rank greater than or equal to 4, 6, 8). In some implementations, a signal-to-noise ratio for channel estimation at a first antenna port may be different than a signal-to-noise ratio for channel estimation at a second antenna port. Thus, the UE may be configured to estimate a signal-to-noise ratio for each antenna port and may utilize tracking reference signal transmissions to estimate the signal-to-noise ratio (for example, power reference) for each antenna port. In some implementations, the base station may indicate one or more of multiple single-port tracking reference signals, a single multi-port tracking reference signal, or a tracking reference signal associated with multiple power ratios.

In some examples, the UE may receive multiple single-port tracking reference signals from a base station. In some such examples, one or more, if not each, of the single-port tracking reference signals may be associated with a respective group of antenna ports for receiving a physical downlink shared channel (PDSCH). In some such examples, the UE may receive a power ratio configuration from the base station, determine the power ratio for one or more of the respective groups of antenna ports based on the power ratio configuration, and estimate a channel upon receiving a demodulation reference signal based on determining the power ratio.

In some other examples, the UE may receive a single multi-port tracking reference signal from a base station. This tracking reference signal may be associated with a set of demodulation reference signal ports. In some such examples, the UE may determine a group of antenna ports based on the set of reference signal ports, and may estimate a channel upon receiving a demodulation reference signal, based on determining the group of antenna ports.

In some other examples, the UE may receive a tracking reference signal associated with multiple power ratios from a base station. The UE may determine that one or more, if not each, of the set of power ratios is associated with a respective group of antenna ports. In some such examples, the UE may estimate a channel upon receiving a demodulation reference signal based on receiving the tracking reference signal associated with the multiple power ratios.

One innovative aspect of the subject matter described in this disclosure can be implemented in a method for wireless communication at a UE. The method includes receiving, from a base station, a set of reference signals associated with a PDSCH, in which each of the set of reference signals is associated with a respective group of antenna ports for receiving the PDSCH, determining a power ratio for one or more of the respective groups of antenna ports based on one or more of the set of reference signals, receiving, from the base station, a demodulation reference signal associated with the PDSCH, estimating a channel associated with the demodulation reference signal based on determining the power ratio, and communicating, with the base station, based on estimating the channel.

Another innovative aspect of the subject matter described in this disclosure can be implemented in an apparatus for wireless communication at a UE. The apparatus includes a processor, memory in electronic communication with the processor, and instructions stored in the memory. The instructions may be executable by the processor to cause the apparatus to receive, from a base station, a set of reference signals associated with a PDSCH, in which each of the set of reference signals is associated with a respective group of antenna ports for receiving the PDSCH, determine a power ratio for one or more of the respective groups of antenna ports based on one or more of the set of reference signals, receive, from the base station, a demodulation reference signal associated with the PDSCH, estimate a channel associated with the demodulation reference signal based on determining the power ratio, and communicate, with the base station, based on estimating the channel.

Another innovative aspect of the subject matter described in this disclosure can be implemented in an apparatus for wireless communication at a UE. The apparatus includes means for receiving, from a base station, a set of reference signals associated with a PDSCH, in which each of the set of reference signals is associated with a respective group of antenna ports for receiving the PDSCH, determining a power ratio for one or more of the respective groups of antenna ports based on one or more of the set of reference signals, receiving, from the base station, a demodulation reference signal associated with the PDSCH, estimating a channel associated with the demodulation reference signal based on determining the power ratio, and communicating, with the base station, based on estimating the channel.

Another innovative aspect of the subject matter described in this disclosure can be implemented in a non-transitory computer-readable medium storing code for wireless communication at a UE. The code includes instructions executable by a processor to receive, from a base station, a set of reference signals associated with a PDSCH, in which each of the set of reference signals is associated with a respective group of antenna ports for receiving the PDSCH, determine a power ratio for one or more of the respective groups of antenna ports based on one or more of the set of reference signals, receive, from the base station, a demodulation reference signal associated with the PDSCH, estimate a channel associated with the demodulation reference signal based on determining the power ratio, and communicate, with the base station, based on estimating the channel.

In some examples of the method, apparatuses, and non-transitory computer-readable medium described herein, the plurality of reference signals are associated with a same PDSCH and a single frequency network configuration.

In some examples of the method, apparatuses, and non-transitory computer-readable medium described herein, receiving the set of reference signals further may include operations, features, means, or instructions for receiving a first reference signal associated with the PDSCH and a second reference signal associated with the PDSCH, in which the first reference signal may be quasi co-located with the second reference signal.

One innovative aspect of the subject matter described in this disclosure can be implemented in a method for wireless communication at a UE. The method includes receiving, from a base station, a reference signal associated with a set of reference signal ports associated with a demodulation reference signal, determining a group of antenna ports based on the set of reference signal ports, receiving, from the base station, the demodulation reference signal associated with a PDSCH, estimating a channel associated with the demodulation reference signal based on determining the group of antenna ports, and communicating, with the base station, based on estimating the channel.

Another innovative aspect of the subject matter described in this disclosure can be implemented in an apparatus for wireless communication at a UE. The apparatus includes a processor, memory in electronic communication with the processor, and instructions stored in the memory. The instructions may be executable by the processor to cause the apparatus to receive, from a base station, a reference signal associated with a set of reference signal ports associated with a demodulation reference signal, determine a group of antenna ports based on the set of reference signal ports, receive, from the base station, the demodulation reference signal associated with a PDSCH, estimate a channel associated with the demodulation reference signal based on determining the group of antenna ports, and communicate, with the base station, based on estimating the channel.

Another innovative aspect of the subject matter described in this disclosure can be implemented in an apparatus for wireless communication at a UE. The apparatus includes means for receiving, from a base station, a reference signal associated with a set of reference signal ports associated with a demodulation reference signal, determining a group of antenna ports based on the set of reference signal ports, receiving, from the base station, the demodulation reference signal associated with a PDSCH, estimating a channel associated with the demodulation reference signal based on determining the group of antenna ports, and communicating, with the base station, based on estimating the channel.

Another innovative aspect of the subject matter described in this disclosure can be implemented in a non-transitory computer-readable medium storing code for wireless communication at a UE. The code includes instructions executable by a processor to receive, from a base station, a reference signal associated with a set of reference signal ports associated with a demodulation reference signal, determine a group of antenna ports based on the set of reference signal ports, receive, from the base station, the demodulation reference signal associated with a PDSCH, estimate a channel associated with the demodulation reference signal based on determining the group of antenna ports, and communicate, with the base station, based on estimating the channel.

Some examples of the method, apparatuses, and non-transitory computer-readable medium described herein may further include operations, features, means, or instructions for determining a rank associated with the UE, and transmitting, to the base station, an indication of the rank associated with the UE. In some examples, receiving the reference signal may be further based on transmitting the indication of the rank.

Some examples of the method, apparatuses, and non-transitory computer-readable medium described herein may further include operations, features, means, or instructions for determining that a rank associated with the UE may be greater than a threshold. In some examples, receiving the reference signal may be further based on determining that the rank associated with the UE may be greater than the threshold.

One innovative aspect of the subject matter described in this disclosure can be implemented in a method for wireless communication at a UE. The method includes determining a rank associated with the UE, transmitting, to a base station, an indication of the rank associated with the UE, receiving, from the base station, a reference signal associated with a set of power ratios based on transmitting the indication of the rank, in which each of the set of power ratios is associated with a respective group of antenna ports, receiving, from the base station, a demodulation reference signal associated with a PDSCH, estimating a channel associated with the demodulation reference signal based on receiving the reference signal, and communicating, with the base station, based on estimating the channel.

Another innovative aspect of the subject matter described in this disclosure can be implemented in an apparatus for wireless communication at a UE. The apparatus includes a processor, memory in electronic communication with the processor, and instructions stored in the memory. The instructions may be executable by the processor to cause the apparatus to determine a rank associated with the UE, transmit, to a base station, an indication of the rank associated with the UE, receive, from the base station, a reference signal associated with a set of power ratios based on transmitting the indication of the rank, in which each of the set of power ratios is associated with a respective group of antenna ports, receive, from the base station, a demodulation reference signal associated with a PDSCH, estimate a channel associated with the demodulation reference signal based on receiving the reference signal, and communicate, with the base station, based on estimating the channel.

Another innovative aspect of the subject matter described in this disclosure can be implemented in an apparatus for wireless communication at a UE. The apparatus includes means for determining a rank associated with the UE, transmitting, to a base station, an indication of the rank associated with the UE, receiving, from the base station, a reference signal associated with a set of power ratios based on transmitting the indication of the rank, in which each of the set of power ratios is associated with a respective group of antenna ports, receiving, from the base station, a demodulation reference signal associated with a PDSCH, estimating a channel associated with the demodulation reference signal based on receiving the reference signal, and communicating, with the base station, based on estimating the channel.

Another innovative aspect of the subject matter described in this disclosure can be implemented in a non-transitory computer-readable medium storing code for wireless communication at a UE. The code includes instructions executable by a processor to determine a rank associated with the UE, transmit, to a base station, an indication of the rank associated with the UE, receive, from the base station, a reference signal associated with a set of power ratios based on transmitting the indication of the rank, in which each of the set of power ratios is associated with a respective group of antenna ports, receive, from the base station, a demodulation reference signal associated with a PDSCH, estimate a channel associated with the demodulation reference signal based on receiving the reference signal, and communicate, with the base station, based on estimating the channel.

In some examples of the method, apparatuses, and non-transitory computer-readable medium described herein, determining one or more of the set of power ratios further may include operations, features, means, or instructions for determining a first energy of each resource element associated with the PDSCH, determining a second energy of each resource element associated with one or more reference signals of the set of reference signals, and determining a ratio between the first energy of each resource element and the second energy of each resource element.

Some examples of the method, apparatuses, and non-transitory computer-readable medium described herein may further include operations, features, means, or instructions for determining a first power ratio associated with a first group of antenna ports based on the reference signal, and determining a second power ratio associated with a second group of antenna ports based on the reference signal, in which the first power ratio and the second power ratio may be included in the set of power ratios, and the first group of antenna ports may be different than the second group of antenna ports.

Some examples of the method, apparatuses, and non-transitory computer-readable medium described herein may further include operations, features, means, or instructions for determining a first power ratio associated with a first group of antenna ports based on the reference signal, and determining a second power ratio associated with a second group of antenna ports based on the reference signal, in which the second group of antenna ports may be a subset of the first group of antenna ports.

One innovative aspect of the subject matter described in this disclosure can be implemented in a method for wireless communication at a base station. The method includes receiving, from a UE, an indication of a rank associated with the UE, transmitting, to the UE, a set of reference signals associated with a PDSCH based on receiving the indication of the rank, in which each of the set of reference signals is associated with a respective group of antenna ports for receiving the PDSCH, and communicating, with the UE, based on transmitting the set of reference signals.

Another innovative aspect of the subject matter described in this disclosure can be implemented in an apparatus for wireless communication at a base station. The apparatus includes a processor, memory in electronic communication with the processor, and instructions stored in the memory. The instructions may be executable by the processor to cause the apparatus to receive, from a UE, an indication of a rank associated with the UE, transmit, to the UE, a set of reference signals associated with a PDSCH based on receiving the indication of the rank, in which each of the set of reference signals is associated with a respective group of antenna ports for receiving the PDSCH, and communicate, with the UE, based on transmitting the set of reference signals.

Another innovative aspect of the subject matter described in this disclosure can be implemented in an apparatus for wireless communication at a base station. The apparatus includes means for receiving, from a UE, an indication of a rank associated with the UE, transmitting, to the UE, a set of reference signals associated with a PDSCH based on receiving the indication of the rank, in which each of the set of reference signals is associated with a respective group of antenna ports for receiving the PDSCH, and communicating, with the UE, based on transmitting the set of reference signals.

Another innovative aspect of the subject matter described in this disclosure can be implemented in a non-transitory computer-readable medium storing code for wireless communication at a base station. The code includes instructions executable by a processor to receive, from a UE, an indication of a rank associated with the UE, transmit, to the UE, a set of reference signals associated with a PDSCH based on receiving the indication of the rank, in which each of the set of reference signals is associated with a respective group of antenna ports for receiving the PDSCH, and communicate, with the UE, based on transmitting the set of reference signals.

In some examples of the method, apparatuses, and non-transitory computer-readable medium described herein, transmitting the set of reference signals further may include operations, features, means, or instructions for transmitting a first reference signal associated with the PDSCH and a second reference signal associated with the PDSCH, in which the first reference signal may be quasi co-located with the second reference signal.

Some examples of the method, apparatuses, and non-transitory computer-readable medium described herein may further include operations, features, means, or instructions for transmitting the set of reference signals may be further based on determining that the rank associated with the UE may be greater than the threshold. In some examples of the method, apparatuses, and non-transitory computer-readable medium described herein, a reference signal of the set of reference signals includes a power ratio for one or more of the respective groups of antenna ports.

One innovative aspect of the subject matter described in this disclosure can be implemented in a method for wireless communication at a base station. The method includes receiving, from a UE, an indication of a rank associated with the UE, transmitting, to the UE, a reference signal associated with a set of reference signal ports based on receiving the indication of the rank, configuring a group of antenna ports based on the set of reference signal ports, and communicating, with the UE, based on determining the group of antenna ports.

Another innovative aspect of the subject matter described in this disclosure can be implemented in an apparatus for wireless communication at a base station. The apparatus includes a processor, memory in electronic communication with the processor, and instructions stored in the memory. The instructions may be executable by the processor to cause the apparatus to receive, from a UE, an indication of a rank associated with the UE, transmit, to the UE, a reference signal associated with a set of reference signal ports based on receiving the indication of the rank, configure a group of antenna ports based on the set of reference signal ports, and communicate, with the UE, based on determining the group of antenna ports.

Another innovative aspect of the subject matter described in this disclosure can be implemented in an apparatus for wireless communication at a base station. The apparatus includes means for receiving, from a UE, an indication of a rank associated with the UE, transmitting, to the UE, a reference signal associated with a set of reference signal ports based on receiving the indication of the rank, configuring a group of antenna ports based on the set of reference signal ports, and communicating, with the UE, based on determining the group of antenna ports.

Another innovative aspect of the subject matter described in this disclosure can be implemented in a non-transitory computer-readable medium storing code for wireless communication at a base station. The code includes instructions executable by a processor to receive, from a UE, an indication of a rank associated with the UE, transmit, to the UE, a reference signal associated with a set of reference signal ports based on receiving the indication of the rank, configure a group of antenna ports based on the set of reference signal ports, and communicate, with the UE, based on determining the group of antenna ports.

Some examples of the method, apparatuses, and non-transitory computer-readable medium described herein may further include operations, features, means, or instructions for determining the rank associated with the UE based on the indication of the rank associated with the UE. In some examples, transmitting the reference signal may be further based on determining the rank associated with the UE.

Some examples of the method, apparatuses, and non-transitory computer-readable medium described herein may further include operations, features, means, or instructions for determining that the rank associated with the UE may be greater than a threshold. In some examples, transmitting the reference signal may be further based on determining that the rank associated with the UE may be greater than the threshold.

One innovative aspect of the subject matter described in this disclosure can be implemented in a method for wireless communication at a base station. The method includes receiving, from a UE, an indication of a rank associated with the UE, transmitting, to the UE, a reference signal associated with a set of power ratios based on receiving the indication of the rank, in which each of the set of power ratios is associated with a respective group of antenna ports, and communicating, with the UE, based on transmitting the reference signal associated with a set of power ratios.

Another innovative aspect of the subject matter described in this disclosure can be implemented in an apparatus for wireless communication at a base station. The apparatus includes a processor, memory in electronic communication with the processor, and instructions stored in the memory. The instructions may be executable by the processor to cause the apparatus to receive, from a UE, an indication of a rank associated with the UE, transmit, to the UE, a reference signal associated with a set of power ratios based on receiving the indication of the rank, in which each of the set of power ratios is associated with a respective group of antenna ports, and communicate, with the UE, based on transmitting the reference signal associated with a set of power ratios.

Another innovative aspect of the subject matter described in this disclosure can be implemented in an apparatus for wireless communication at a base station. The apparatus includes means for receiving, from a UE, an indication of a rank associated with the UE, transmitting, to the UE, a reference signal associated with a set of power ratios based on receiving the indication of the rank, in which each of the set of power ratios is associated with a respective group of antenna ports, and communicating, with the UE, based on transmitting the reference signal associated with a set of power ratios.

Another innovative aspect of the subject matter described in this disclosure can be implemented in a non-transitory computer-readable medium storing code for wireless communication at a base station. The code includes instructions executable by a processor to receive, from a UE, an indication of a rank associated with the UE, transmit, to the UE, a reference signal associated with a set of power ratios based on receiving the indication of the rank, in which each of the set of power ratios is associated with a respective group of antenna ports, and communicate, with the UE, based on transmitting the reference signal associated with a set of power ratios.

Some examples of the method, apparatuses, and non-transitory computer-readable medium described herein may further include operations, features, means, or instructions for configuring a first power ratio associated with a first group of antenna ports based on the reference signal, and configuring a second power ratio associated with a second group of antenna ports based on the reference signal, in which the first power ratio and the second power ratio may be included in the set of power ratios, and the first group of antenna ports may be different than the second group of antenna ports.

Some examples of the method, apparatuses, and non-transitory computer-readable medium described herein may further include operations, features, means, or instructions for configuring a first power ratio associated with a first group of antenna ports based on the reference signal, and configuring a second power ratio associated with a second group of antenna ports based on the reference signal, in which the second group of antenna ports may be a subset of the first group of antenna ports.

DETAILED DESCRIPTION

Figure 1:
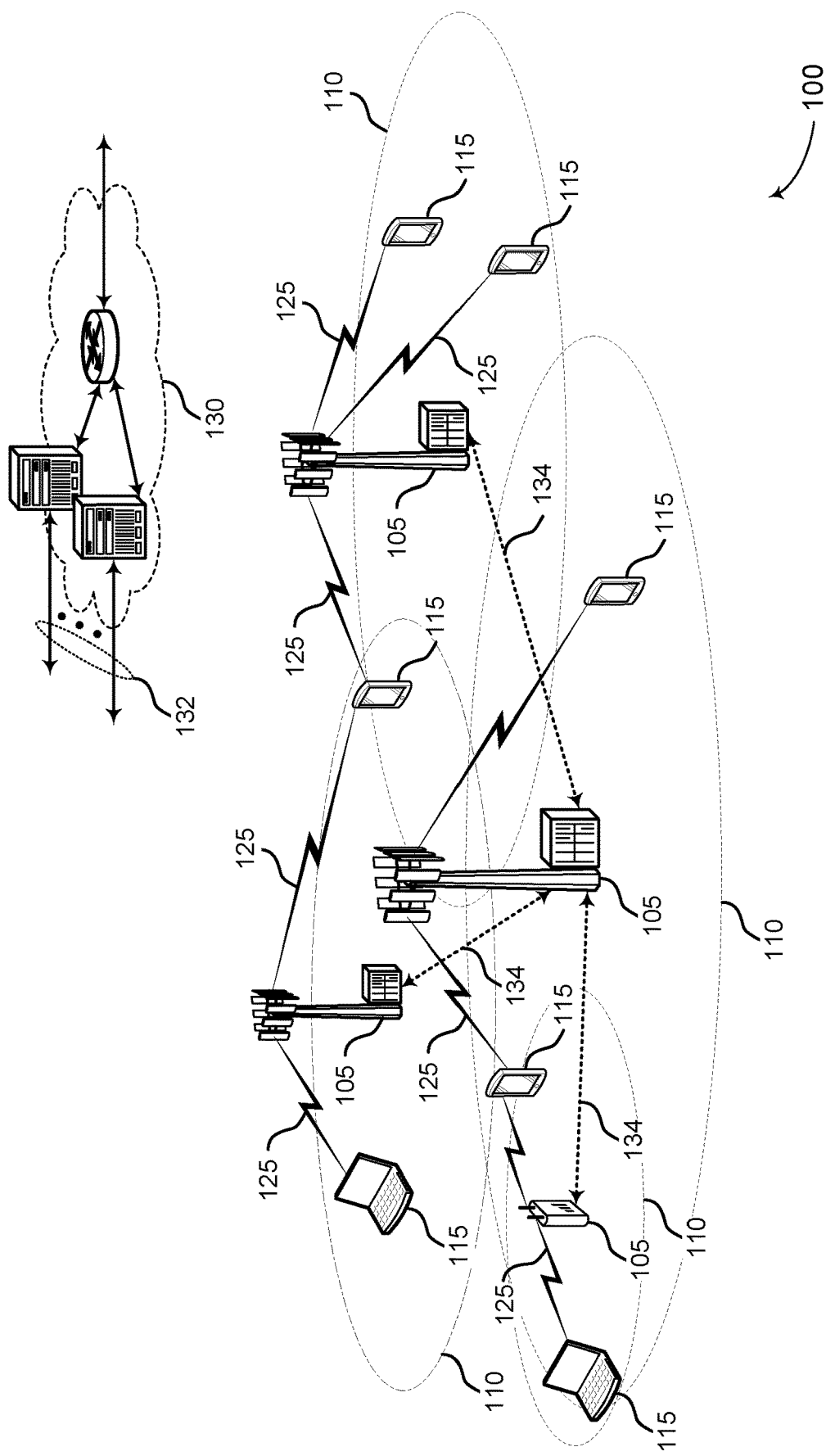
FIG. 1 illustrates an example of a wireless communications system that supports multiple power references for high rank transmissions in accordance with aspects of the present disclosure.

A user equipment (UE) in a wireless communications system, such as a New Radio (NR) system or a Long Term Evolution (LTE) system, may perform time and frequency tracking using reference signals transmitted by a base station. The UE may use reference signals (for example, tracking reference signals) to obtain fine time and frequency tracking measurements. The UE may, in some implementations, use a set of antenna ports to receive the one or more tracking reference signals. In some examples, two or more antenna ports from the set of antenna ports may be quasi co-located. In other words, parameters (for example, doppler shift, doppler spread, average delay, delay spread, spatial reception parameter) of a transmission on one antenna port may be inferred from the parameters of another transmission on a different antenna port. In some examples, the UE may perform channel estimation for demodulating data or control information received on a first set of antenna ports based on reference signals (for example, demodulation reference signals) received on a second set of antenna ports that are quasi co-located with the first set of antenna ports.

In some wireless communications systems, the UE and the base station may communicate using massive multiple input/multiple output (MIMO) operations. Additionally, the UE may be associated with high rank transmissions (for example, transmissions associated with a rank that is greater than or equal to a threshold). For example, a rank of the UE may indicate a number of streams (for example, signals) that may be transmitted using multiple antennas via a channel at the UE. In typical wireless communications systems, each antenna port may be associated with a respective tracking reference signal. In other words, a tracking reference signal may be received at a single antenna port, and the UE may perform channel estimation based on calculating an average signal-to-noise ratio associated with receiving the tracking reference signal. High rank transmissions, however, may result in an imbalanced signal-to-noise ratio calculation across different antenna ports. It may be desirable to support increased measurement capabilities at the UE to estimate multiple signal-to-noise ratios for multiple antenna ports.

In various aspects, a UE may be configured to estimate a signal-to-noise ratio for each antenna port. In some aspects, the base station may transmit one or more of multiple single-port tracking reference signals, a single multi-port tracking reference signal, or a tracking reference signal associated with multiple power ratios. The UE may use a set of antenna ports to receive the one or more tracking reference signals. The UE may be configured to estimate a signal-to-noise ratio for one or more, if not each, antenna port for high rank transmissions. In some implementations, the UE may receive multiple single-port tracking reference signals associated with a physical downlink shared channel (PDSCH). In some such implementations, each single-port tracking reference signal may be associated with a same PDSCH as part of a single frequency network. In some examples, the base station may configure one or more, if not each, of the multiple single-port tracking reference signals to be associated with a respective group of antenna ports for receiving the PDSCH. In some other implementations, the UE may receive a single multi-port tracking reference signal associated with a set of reference signal ports. In yet other implementations, the UE may receive a tracking reference signal associated with multiple power ratios, where each of the set of power ratios may be associated with a respective group of antenna ports. The UE may be able to estimate a channel upon receiving a demodulation reference signal based on the reception of one or more of multiple single-port tracking reference signals, a single multi-port tracking reference signal, or a tracking reference signal associated with multiple power ratios.

Particular aspects of the subject matter described in this disclosure can be implemented to realize one or more of the following potential advantages. In some examples, the described techniques can be used to increase UE capabilities to support multiple power references for high rank transmissions. For example, UEs capable of supporting multiple power references for high rank transmissions may utilize the techniques described herein to experience power saving, such as reduced power consumption and extended battery life while ensuring reliable and efficient communications between UEs and base stations.

Aspects of the disclosure are initially described in the context of a wireless communications system. Aspects of the disclosure are further illustrated by and described with reference to apparatus diagrams, system diagrams, and flowcharts that relate to multiple power references for high rank transmissions.

FIG. 1 illustrates an example of a wireless communications system 100 that supports multiple power references for high rank transmissions in accordance with aspects of the present disclosure. In one or more examples, the multiple power references may include multiple power ratios associated with reference signals (for example, tracking reference signals). The wireless communications system 100 includes base stations 105, UEs 115, and a core network 130. In some examples, the wireless communications system 100 may be an LTE network, an LTE-Advanced (LTE-A) network, an LTE-A Pro network, or an NR network. In some implementations, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, among other examples.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, in which the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, among other examples, which may be implemented in various articles such as appliances, vehicles, meters, among other examples.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some implementations, UEs 115 may be designed to support critical functions (for example, mission critical functions), and a wireless communications system 100 may be configured to provide ultra-reliable communications for these functions.

In some implementations, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some implementations, a base station 105 facilitates the scheduling of resources for D2D communications. In other examples, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some implementations, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some implementations, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some implementations, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, MIMO communications, or beamforming. For example, wireless communications system 100 may use a transmission scheme between a transmitting device (for example, a base station 105) and a receiving device (for example, a UE 115), in which the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) in which multiple spatial layers are transmitted to the same receiving device, and multiple-user MIMO (MU-MIMO) in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In some examples, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception, or both by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a set of antenna elements of an antenna array, or by processing received signals according to different receive beamforming weight sets applied to signals received at a set of antenna elements of an antenna array, any of which may be referred to as "listening" according to different receive beams or receive directions. In some examples, a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some implementations, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some implementations, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control protocol layer may provide establishment, configuration, and maintenance of a Radio Resource Control connection between a UE 115 and a base station 105 or core network 130 supporting radio bearers for user plane data. At the Physical layer, transport channels may be mapped to physical channels.

In some implementations, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some implementations, a wireless device may support same-slot HARQ feedback, in which the device may provide HARQ feedback in a specific slot for data received in a previous symbol in the slot. In other examples, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), in which the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some implementations, a subframe may be the smallest scheduling unit of the wireless communications system 100, and may be referred to as a transmission time interval (TTI). In other implementations, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115, or both that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some implementations, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some implementations, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, in which more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some implementations, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz) at reduced symbol durations (for example, 16.67 microseconds). A TTI in eCC may consist of one or multiple symbol periods. In some implementations, the TTI duration (in other words, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

A UE 115 may perform time and frequency tracking using reference signals transmitted by a base station. The UE 115 may use reference signals (for example, tracking reference signals) to obtain fine time and frequency tracking measurements. The UE 115 may, in some implementations, use a set of antenna ports to receive the one or more tracking reference signals. In some examples, two or more antenna ports from the set of antenna ports may be quasi co-located. In other words, parameters (for example, doppler shift, doppler spread, average delay, delay spread, spatial reception parameter) of a transmission on one antenna port may be inferred from the parameters of another transmission on a different antenna port. In some examples, the UE 115 may perform channel estimation for demodulating data or control information received on a first set of antenna ports based on reference signals (for example, demodulation reference signals) received on a second set of antenna ports that are quasi co-located with the first set of antenna ports.

In some wireless communications systems (for example, wireless communications system 100), the UE 115 and the base station may communicate using massive MIMO operations. Additionally, the UE 115 may be associated with high rank transmissions (for example, transmissions associated with a rank that is greater than or equal to a threshold). For example, a rank of the UE 115 may indicate a number of streams (for example, signals) that may be transmitted using multiple antennas via a channel at the UE 115. In typical wireless communications systems, each antenna port may be associated with a respective tracking reference signal. In other words, a tracking reference signal may be received at a single antenna port, and the UE 115 may perform channel estimation based on calculating an average signal-to-noise ratio associated with receiving the tracking reference signal. High rank transmissions, however, may result in an imbalanced signal-to-noise ratio calculation across different antenna ports. It may be desirable to support increased estimation capabilities at the UE 115 to estimate multiple signal-to-noise ratios for multiple antenna ports.

In various aspects, a UE 115 may be configured to estimate a signal-to-noise ratio for each antenna port. In some aspects, the base station may transmit one or more of multiple single-port tracking reference signals, a single multi-port tracking reference signal, or a tracking reference signal associated with multiple power ratios. The UE 115 may use a set of antenna ports to receive the one or more tracking reference signals. The UE 115 may be configured to estimate a signal-to-noise ratio for one or more, if not each, antenna port for high rank transmissions. In some implementations, the UE 115 may receive multiple single-port tracking reference signals associated with a physical downlink shared channel (PDSCH). In some such implementations, each single-port tracking reference signal may be associated with a same PDSCH as part of a single frequency network. In some examples, the base station may configure one or more, if not each, of the multiple single-port tracking reference signals to be associated with a respective group of antenna ports for receiving the PDSCH. In some other implementations, the UE 115 may receive a single multi-port tracking reference signal associated with a set of reference signal ports. In yet other implementations, the UE 115 may receive a tracking reference signal associated with multiple power ratios, where each of the set of power ratios may be associated with a respective group of antenna ports. The UE 115 may be able to estimate a channel upon receiving a demodulation reference signal based on the reception of one or more of multiple single-port tracking reference signals, a single multi-port tracking reference signal, or a tracking reference signal associated with multiple power ratios.

In wireless communications system 100, multiple data streams transmitted from a base station may be mapped to antennas using antenna ports. An antenna port may be a logical entity used to map one or more data streams to one or more antennas. A given antenna port may drive transmissions from one or more antennas and resolve signal components received over one or more antennas. In some implementations, two or more antenna ports from the set of antenna ports may be quasi co-located. Some wireless communications systems use a tracking reference signal associated with one antenna port. In other words, a tracking reference signal may be received at a single antenna port, and the UE 115 may perform channel estimation based on calculating an average signal-to-noise ratio associated with receiving the tracking reference signal. High rank transmissions, however, may result in an imbalanced signal-to-noise ratio calculation across different antenna ports.

According to one or more aspects of the present disclosure, the UE 115 may be configured to estimate a signal-to-noise ratio for one or more, if not each, antenna port. In a first implementation, a base station 105 may transmit multiple single-port tracking reference signals to the UE 115. For example, the UE 115 may receive multiple single-port tracking reference signals associated with a PDSCH, in which each of the multiple single-port tracking reference signals is associated with a respective group of antenna ports for receiving the PDSCH. In some examples, the associated PDSCH is a same PDSCH for each single-port tracking reference signal. Such an example may be implemented as part of a single frequency network communications system. In some other implementations, the base station 105 may transmit a single multi-port tracking reference signal. For example, the UE 115 may receive the single multi-port tracking reference signal associated with a set of reference signal ports. In yet other implementations, the base station 105 may transmit a tracking reference signal associated with multiple power ratios. In such an example, each of the multiple power ratios may be associated with a respective group of antenna ports. The UE 115 may receive at least one of the multiple single-port tracking reference signals, the single multi-port tracking reference signal, or the tracking reference signal associated with multiple power ratios, and may estimate a signal-to-noise ratio for one or more, if not each, antenna port. In some implementations, the UE 115 may be able to estimate a channel upon receiving a demodulation reference signal based on the reception of the one or more of multiple single-port tracking reference signals, the single multi-port tracking reference signal, or the tracking reference signal associated with multiple power ratios.

Particular aspects of the subject matter described in this disclosure can be implemented to realize one or more of the following potential advantages. In some examples, the described techniques can be used to increase UE capabilities to support multiple power references for high rank transmissions. For example, UEs capable of supporting multiple power references for high rank transmissions may utilize the techniques described herein to experience power saving, such as reduced power consumption and extended battery life while ensuring reliable and efficient communications between UEs and base stations.

Figure 2:
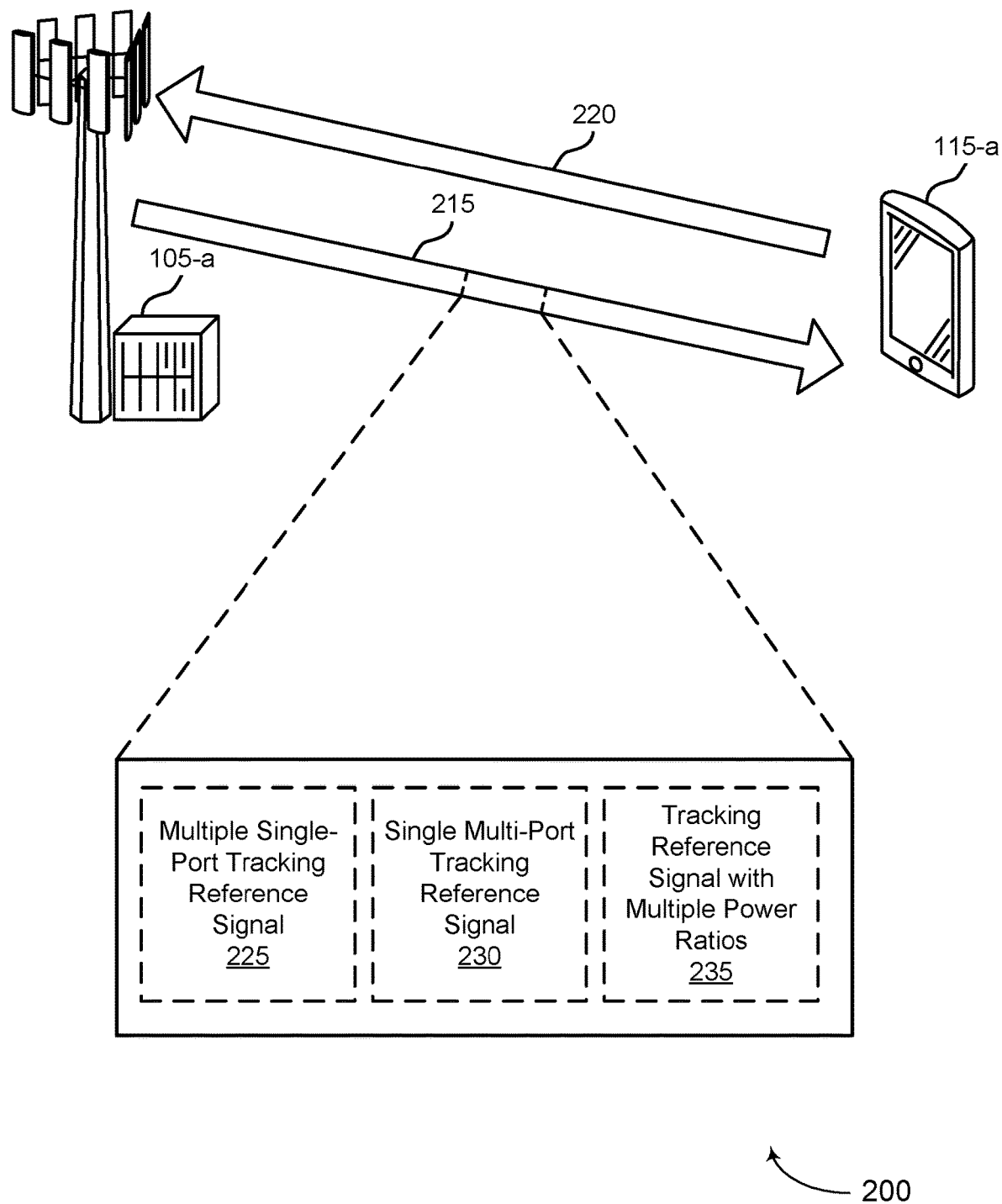
FIG. 2 illustrates an example of a wireless communications system that supports multiple power references for high rank transmissions in accordance with aspects of the present disclosure.

FIG. 2 illustrates an example of a wireless communications system 200 that supports multiple power references for high rank transmissions in accordance with aspects of the present disclosure. In some examples, the wireless communications system 200 may implement aspects of the wireless communications system 100. The wireless communications system 200 may include a base station 105-a and a UE 115-a, which may be examples of the corresponding devices as described with reference to FIG. 1. In some examples, the base station 105-a may also be referred to as a transmission-reception point. In some implementations, the UE 115-a and the base station 105-a may communicate using one or more reference signals (for example, a Channel State Information Reference Signal (CSI-RS) and a tracking reference signal). The UE 115-a and the base station 105-a may operate in a mmW spectrum or using NR technologies, or both. In some implementations, the UE 115-a and the base station 105-a may communicate using beamforming techniques (in other words, the reference signals may be transmitted on corresponding beams) or utilize MIMO operations, or both. According to one or more example implementations, the UE 115-a and the base station 105-a may perform massive MIMO operations using NR technologies.

In some wireless systems (for example, NR wireless systems), such as wireless communications system 200, the UE 115-a may exit from an idle state and enter a connected state with the base station 105-a within a network. The base station 105-a may transmit synchronization signals, such as periodic synchronization signals (for example, over multiples beams), for an initial UE configuration procedure. In some implementations, the base station 105-a may transmit the synchronization signals in a synchronization block (for example, a synchronization signal block). The synchronization block may span a set of symbol periods in the time domain, and may span at least a portion of a bandwidth in the frequency domain. Upon connecting with the base station 105-a, the UE 115-a may receive the synchronization block and may perform one or more configuration processes based on information included within the synchronization block. In some examples, the UE 115-a may perform time or frequency tracking based on a synchronization signal within the received synchronization block.

According to one or more implementations, the base station 105-a may transmit a reference signal in addition to the synchronization block for time or frequency tracking. In some implementations, the reference signal may be a tracking reference signal. In some examples, the base station 105-a may transmit the tracking reference signal using a same subcarrier spacing as the synchronization block. In some implementations, the base station 105-a may determine an operation mode of the UE 115-a (for example, a connected mode). The base station 105-a may transmit the tracking reference signal based on the determination of the operating mode of the UE 115-a. For example, the base station 105-a may transmit the tracking reference signal based on determining that the UE 115-a is in the connected mode.

In some example implementations, the base station 105-a may transmit the tracking reference signal over at least a portion of a set of symbols spanned by the synchronization block. Additionally or alternatively, the base station 105-a may periodically transmit the tracking reference signal over a subset of a periodic synchronization block transmission. In some implementations, a tracking reference signal may include a set of CSI-RS. A tracking reference signal may be associated with one demodulation reference signal antenna port, and may be configured based on a carrier frequency, a sub-carrier spacing, and a modulation and coding scheme, among other aspects. In some examples, a tracking reference signal may be used to minimize the effect of phase noise in a wireless communications system (such as, wireless communications system 200), track time, track frequency, measure a path delay spread or doppler spread, among other aspects.

In some examples, a duration of the tracking reference signal may be two slots for a sub-6 frequency range (for example, a frequency range below 6 GHz, in the range of 1-6 GHz), and may be one or two slots for a frequency range above the sub-6 frequency range. Additionally, or alternatively, a periodicity associated with the tracking reference signal may be at least one of 10 ms, 20 ms, 40 ms, and 80 ms. In some implementations, a bandwidth of the tracking reference signal may be configured to possess different periodicities. For example, the bandwidth of the tracking reference signal may be 50 resource blocks for a periodicity of 20 ms. In some implementations, a subcarrier spacing associated with the tracking reference signal may be four, and a symbol spacing associated with the tracking reference signal may be four.

In some wireless communications systems (such as wireless communications system 200), the base station 105-a may communicate with the UE 115-a using multiple antennas. For example, the base station 105-a may transmit parallel data streams over respective antennas to increase throughput (in other words, as opposed to transmitting the data streams sequentially over the same antenna). Additionally, or alternatively, the base station 105-a may transmit a given data stream over multiple antennas, for example, simultaneously. For example, the base station 105-a may simultaneously transmit the data steam to increase the diversity of the transmissions. In some implementations, the use of multiple antennas may be based on the use of one or more antenna ports. An antenna port may be a logical entity used to map data streams to the multiple antennas. In some example implementations, a given antenna port may drive transmissions from the multiple antennas, and resolve signal components received over the multiple antennas. In some examples, each antenna port may be associated with a reference signal (for example, a tracking reference signal). The reference signals may allow a receiver to distinguish data streams associated with the different antenna ports in a received transmission. Based on using the multiple antennas, a quasi co-location relationship may exist between the one or more antenna ports that correspond to the multiple antennas.

The quasi co-location relationship for a set of antenna ports may indicate that spatial parameters of a transmission on one antenna port (for example, doppler shift, doppler spread, average delay, delay spread, spatial reception parameter) may be inferred from the spatial parameters of another transmission on a different antenna port. Based on the quasi co-location relationship, the UE 115-a may be able to perform channel estimation for demodulating data or control information received on a first set of antenna ports based on reference signals received on a second set of antenna ports that is quasi co-located with the first set of antenna ports. For example, the UE 115-a may perform the channel estimation for demodulating the data or control information based on demodulation reference signals.

In some example implementations, a spatial quasi co-location relationship between antenna ports (also referred to as a quasi co-location assumption if the spatial quasi co-location relationship is assumed) may improve the likelihood that the UE 115-a may be able to successfully decode a downlink transmission from the base station 105-a. In some implementations, an antenna port for a tracking reference signal may be quasi co-located with a PDSCH. The UE 115-a may receive a power ratio value from the base station 105-a. For example, the UE 115-a may receive an indication of a power ratio between a power associated with a PDSCH and an energy of each resource element (for example, energy per resource element (EPRE)) of the tracking reference signal. In some implementations, the UE 115-a may receive a tracking reference signal associated with an antenna port and identify a signal-to-noise ratio associated with the tracking reference signal. The UE 115-a may then determine the PDSCH, for example, based on the energy of each resource element received from the base station 105-a (through higher layer signaling).

In some implementations, the UE 115-a may be associated with a high rank (for example, a rank greater than or equal to 4, 6, 8). For example, a rank of the UE 115-a may indicate a number of streams (for example, signals) that may be transmitted using multiple antennas via a channel at the UE 115-a. In some existing wireless communications systems, however, the tracking reference signal may be associated with one antenna port. In other words, the tracking reference signal may be received at a single antenna port, and the UE 115-a may perform channel estimation for demodulating data or control information received on the set of antenna ports, for example, based on calculating an average signal-to-noise ratio associated with receiving the tracking reference signal. Because the UE 115-a is associated with a high rank, a signal-to-noise ratio for channel estimation at a first antenna port may be different than a signal-to-noise ratio for channel estimation at a second antenna port. Thus, UEs having or being configured for a high rank in existing wireless systems may result in an imbalanced signal-to-noise ratio calculation across different antenna ports. Additionally, the imbalanced signal-to-noise ratio calculation may incur large performance loss at one or more UEs (for example, UE 115-a).

To overcome the limitation of supporting one antenna port for a tracking reference signal, according to one or more aspects of the present disclosure, the UE 115-a may be configured to estimate a signal-to-noise ratio for each antenna port. Specifically, the UE 115-a may be configured to estimate a signal-to-noise ratio for one or more, if not each, antenna port for high rank transmissions (that is, in implementations in which a difference between a signal-to-noise ratio at a first antenna port and a signal-to-noise ratio at a second antenna port is greater than a threshold value). As further described with reference to FIG. 2, the UE 115-a may utilize different tracking reference signal transmissions to estimate a signal-to-noise ratio for each antenna port.

In some implementations, the base station 105-a may transmit a message 215 to the UE 115-a. For example, the base station 105-a may transmit the message 215 via a number of transmission antennas (not shown). In some implementations, the UE 115-a may receive the message 215 via a number of receive antennas. In some examples, the message 215 may include one or more reference signals (for example, tracking reference signals). The number of transmission antennas and the number of receive antennas may be the same in some implementations and different in other implementations. In some examples, the UE 115-a may determine a rank, and may transmit an indication of the rank to the base station 105-a. In some implementations, if the number of receive antennas and the number of transmission antennas are different, then the UE 115-a may report the indication of the rank as the lesser of the two numbers. In some examples, a transmission may be considered high rank if the UE 115-a reports the indication of the rank to be four or more, among other implementations. As depicted in the example of FIG. 2, the base station 105-a may include in the message 215 one or more of multiple single-port tracking reference signals 225, a single multi-port tracking reference signal 230, or a tracking reference signal 235 associated with multiple power ratios.

According to one or more aspects of the present disclosure, the base station 105-a may transmit multiple single-port tracking reference signals 225 to the UE 115-a associated with a single PDSCH (for example, each tracking reference signal may be associated with the same PDSCH as part of a single frequency network. In some implementations, each of the multiple single-port tracking reference signals 225 may be associated with a respective group of antenna ports for receiving the PDSCH. Additionally, each of the multiple single-port tracking reference signals 225 may include a power ratio for one or more of the respective groups of antenna ports. In some implementations, a group of antenna ports associated with the multiple single-port tracking reference signals 225 may be quasi co-located for multiple parameters with respect to a same source. In some examples, the parameters may include one or more of a doppler shift, a doppler spread, an average delay, or a delay spread. In some implementations, the parameters may not include an average gain associated with one or more, if not each, of the multiple single-port tracking reference signals 225. In other words, the average gain associated with each of the multiple single-port tracking reference signals 225 may be different (because the multiple single-port tracking reference signals 225 may be associated with different antenna ports). Additionally, a source identifier may include a synchronization signal block identifier or a quasi co-location identifier configured by the base station 105-a using a radio resource control configuration.

The UE 115-a may receive the multiple single-port tracking reference signals 225 from the base station 105-a, and may determine a power ratio for one or more of the respective groups of antenna ports based on one or more of the single-port tracking reference signals 225. In some examples, the base station 105-a may configure the power ratio, and indicate the power ratio to the UE 115-a. The UE 115-a may determine the power ratio based on receiving the indication from the base station 105-a. In some example implementations, the UE 115-a may determine a first energy of each resource element (for example, EPRE) associated with the PDSCH and a second energy of each resource element associated with a tracking reference signal (for example, a tracking reference signal included in the multiple single-port tracking reference signals 225). The UE 115-a may then calculate a power ratio between the first energy and the second energy for each resource element. In some implementations, the UE 115-a may receive a demodulation reference signal from the base station 105-a. Upon receiving the demodulation reference signal, the UE 115-a may estimate a channel (in other words, perform a channel estimation) based on the calculated power ratio. In some examples, the UE 115-a may be able to calculate multiple power ratios (for example, based on the multiple single-port tracking reference signals 225), and may accurately estimate the channel (for example, a channel associated with the PDSCH) based on the multiple power ratios.

In some implementations, the UE 115-a may receive the multiple single-port tracking reference signals 225 on the same symbol. For example, resources associated with the multiple single-port tracking reference signals 225 may be received on the same symbol with different combinations of antenna ports, such that the resources may be received at the same time by the UE 115-a, which may result in concurrent processing of the resources. In some examples, a quantity of the single-port tracking reference signals 225 may be less than or equal to a quantity of antenna ports at the UE 115-a. In some implementations, one or more of the multiple single-port tracking reference signals 225 may be aperiodic tracking reference signals. In some implementations, the base station 105-a may set a bit included in a downlink control indicator to indicate such aperiodic tracking reference signals. The UE 115-a may receive the downlink control indicator, identify the bit included in the downlink control indicator, and receive the aperiodic tracking reference signal based on the bit. Such a method of indicating an aperiodic tracking reference signal may reduce overhead computing costs.

In some implementations in which the multiple single-port tracking reference signals 225 are associated with a single PDSCH (for example, as implemented in a single frequency network), the multiple single-port tracking reference signals 225 may further include at least one periodic tracking reference signal in addition to the aperiodic tracking reference signals. In some examples, the aperiodic tracking reference signals may carry one or more additional power ratios. In some examples, the periodic tracking reference signal may provide an average energy of each resource element (for example, average EPRE) across all antenna ports, while the aperiodic tracking reference signals may provide one or more additional power ratios for high rank transmissions at the UE 115-a (such as on an ad-hoc basis).

According to one or more other aspects of the present disclosure, the base station 105-a may transmit a single multi-port tracking reference signal 230 to the UE 115-a. In some examples, the base station 105-a may transmit the multi-port tracking reference signal 230 with multiple reference signal ports. The reference signal ports may be associated with a demodulation reference signal. In some instances, the base station 105-a may indicate a quasi co-location type to the UE 115-a using a higher layer parameter, for example, a QCL-Type. The quasi co-location type may indicate one or more parameters (for example, channel properties) that may be shared among transmissions of the same quasi co-location type. Additionally, the base station 105-a may indicate to the UE 115-a, the groups of antenna ports that are quasi co-located and the QCL-Type associated with the groups of antenna ports. In some implementations, the QCL-Type may take one or a combination of the following types shown in Table 1.1, among other examples, which details the qualities or assumptions that may be shared among transmissions of the same quasi co-location type.

TABLE 1.1

| | |
|---|---|
| QCL-TypeA | {Doppler shift, Doppler spread, average delay, delay spread} |
| QCL-TypeB | {Doppler shift, Doppler spread} |
| QCL-TypeC | {average delay, Doppler shift} |
| QCL-TypeD | {Spatial Receive (Rx) Parameter} |

When transmitting the single multi-port tracking reference signal 230, the base station 105-a may indicate that the reference signal ports are quasi co-located based on a quasi co-location type of QCL-TypeA. In other words, the UE 115-a may determine that the reference signal ports are quasi co-located for a doppler shift, a doppler spread, an average delay, or a delay spread. Additionally, the UE 115-a may determine a group of antenna ports based on the reference signal ports. In some implementations, the base station 105-a may configure the group of antenna ports to be quasi co-located with respect to an average gain for each port of the reference signal ports. In some examples, the single multi-port tracking reference signal 230 may have a lower density due to multiple ports and may reduce overhead computing costs. In some examples, the single multi-port tracking reference signal 230 may be aperiodic. Additionally, the base station 105-a may transmit the aperiodic single multi-port tracking reference signal 230 in conjunction with scheduling of a high rank PDSCH. In this example, the UE 115-a may be able to measure a signal-to-noise ratio associated with each antenna port based on receiving the aperiodic single multi-port tracking reference signal 230.

According to one or more other aspects of the present disclosure, the base station 105-a may transmit a tracking reference signal 235 associated with multiple power ratios to the UE 115-a. In some implementations, the UE 115-a may receive the tracking reference signal 235 associated with the multiple power ratios upon transmitting an indication of a rank to the base station 105-a. In some examples, the UE 115-a may transmit the indication of the rank using an uplink message 220. The base station 105-a may determine that the rank is equal to or greater than a threshold (for example, the threshold may be 4), and may transmit the tracking reference signal 235 associated with the multiple power ratios.

In some implementations, each of the multiple power ratios may be associated with a respective group of antenna ports. In some examples, the UE 115-a may determine that each of the multiple power ratios is associated with a different group of antenna ports. In an alternative example, the UE 115-a may determine that a first power ratio of the multiple power ratios may correspond to an average power across all antenna ports, and additional power ratios included in the multiple power ratios may be associated with corresponding antenna ports. In such examples, a range of the additional power ratios may be different than the range of the first power ratio (for example, in steps of 5 decibel (dB)).

Additionally or alternatively, the UE 115-a may receive a configuration message and a control indication (for example, via a downlink control indicator or a media access layer control element) from the base station 105-a. The UE 115-a may receive the tracking reference signal 235 associated with the multiple power ratios based on the configuration message. In some examples, the configuration message may include a radio resource control configuration.

In some implementations, the UE 115-a may determine a scaling factor associated with a group of antenna ports based on receiving the control indication. For example, the UE 115-a may determine the group of antenna ports (for example, from an antenna port table) based on determining the scaling factor. In some examples, the antenna port table may indicate ports {0, 1, 2, 3} with scaling {0, –10, –20, –20} dB, ports {0, 1, 2, 3} with scaling {0, 0, 0, 0} dB, or ports {0, 1, 2, 3} with scaling {0, –10, –20, –20} dB, or both. The scaling factor may conserve space within the antenna port table in examples in which the UE 115-a signals a high rank multiple rows with different scaling factors.

Figure 3:
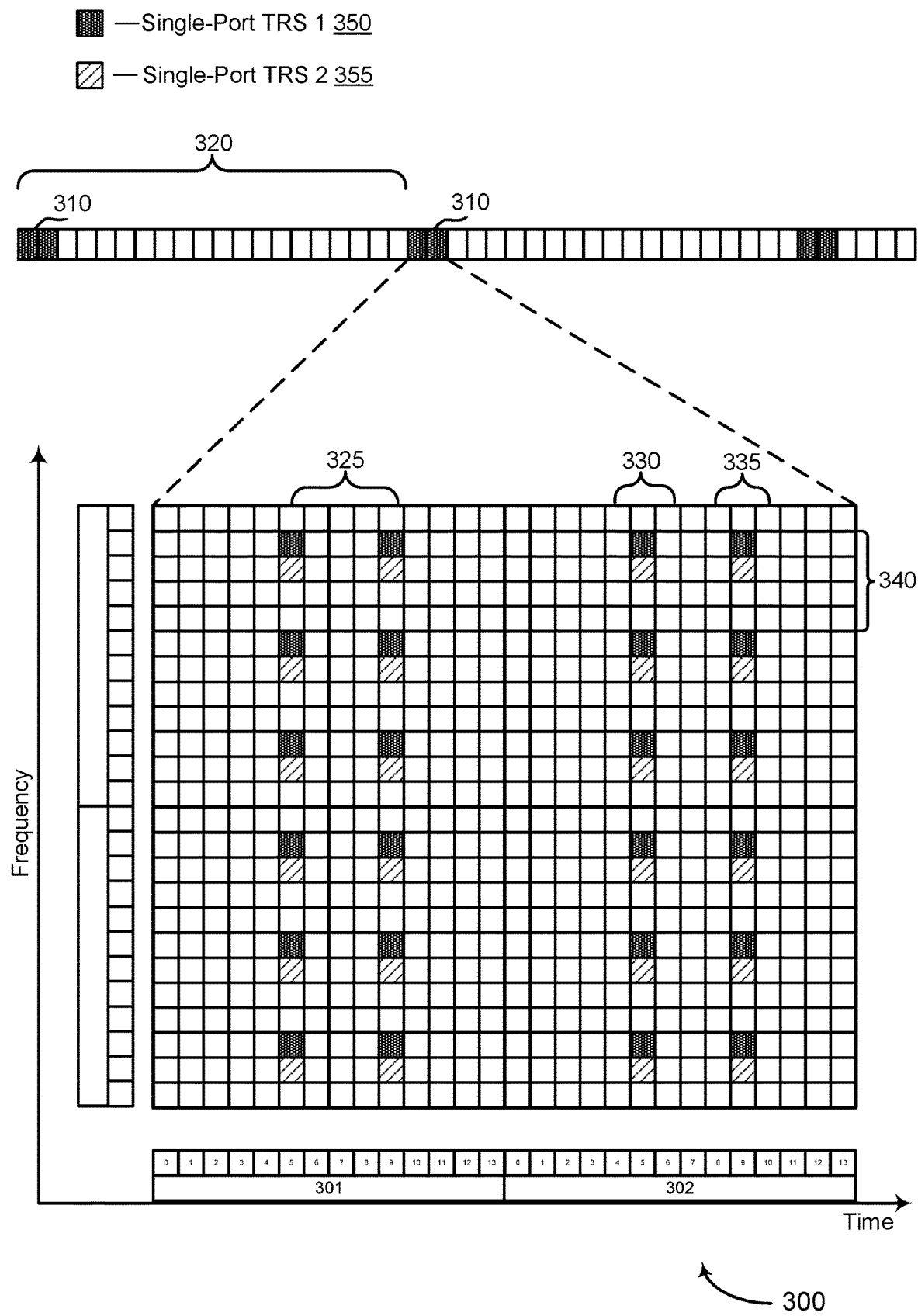
FIG. 3 illustrates an example of a resource allocation that supports multiple power references for high rank transmissions in accordance with aspects of the present disclosure.

FIG. 3 illustrates an example of a resource allocation 300 that supports multiple power references for high rank transmissions in accordance with aspects of the present disclosure. In some examples, the resource allocation 300 may implement aspects of wireless communications systems 100 and 200. The resource allocation 300 may include tracking reference signal burst 310 which may further include slots 301 and 302. The resource allocation 300 may further include a tracking reference signal inter-symbol distance 325, configurable tracking reference signal symbol positions 330 and 335, and a tracking reference signal subcarrier distance 340, as they relate to single-port tracking reference signals 350 and 355. In some implementations, a tracking reference signal burst interval 320 may occur between a tracking reference signal burst 310 and a next tracking reference signal burst 310. A length of the tracking reference signal burst interval 320 may, in some examples, be 10 ms, 20 ms, 40 ms, or 80 ms.

According to the example in FIG. 3, the tracking reference signal burst 310 may have a length of two slots (for example slots 301 and 302). Each of the two slots may include fourteen symbols. In some examples, the tracking reference signal subcarrier distance 340 may be a distance of four subcarriers. In some examples, the tracking reference signal inter-symbol distance 325 may be a distance of four symbols within a slot (for example slots 301 and 302). In some examples, the tracking reference signal burst 310 may be associated with a group of antenna ports (for example, demodulation reference signal or PDSCH antenna ports) and may be associated with a single PDSCH. Additionally or alternatively, a base station may convey a power ratio for one or more of the respective groups of antenna ports within each tracking reference signal burst 310. In some implementations, higher layer signaling may be used to convey the power ratios. A UE may receive multiple tracking reference signal bursts 310 associated with the same PDSCH, and may perform signal-to-noise ratio estimation.

In some implementations, the UE may perform a signal-to-noise ratio estimation upon receiving the tracking reference signal burst 310. Additionally or alternatively, each power ratio of the multiple power ratios may be associated with a different set of ports (for example, demodulation reference signal or PDSCH antenna ports). According to one or more aspects of the present disclosure, the UE may be configured to estimate the signal-to-noise ratio for an antenna port upon receiving multiple single-port tracking reference signals. As described with reference to symbols 5 and 9 of the slots 301 and 302, the base station may transmit a first single-port tracking reference signal 350 at subcarriers 1, 5 and, 9. Additionally, the base station may transmit a second single-port tracking reference signal 355 at subcarriers 2, 6 and 10. Thus, the UE may receive multiple single-port tracking reference signals (for example, the first single-port tracking reference signal 350 and the second single-port tracking reference signal 355), and may estimate a signal-to-noise ratio for one or more, if not each, antenna port for high rank transmissions.

In some other implementations (not shown in FIG. 3) the UE may be configured to estimate the signal-to-noise ratio for an antenna port upon receiving a single multi-port tracking reference signal. In some examples, the single multi-port tracking reference signal may be associated with a set of reference signal ports. According to a third implementation (not shown in FIG. 3), the UE may be configured to estimate the signal-to-noise ratio for an antenna port upon receiving a tracking reference signal associated with multiple power ratios. In some examples, each of the multiple power ratios may be associated with a respective group of antenna ports. The UE may be able to estimate a channel upon receiving a demodulation reference signal based on the reception of one or more of multiple single-port tracking reference signals, a single multi-port tracking reference signal, or a tracking reference signal associated with multiple power ratios. Such a method may enhance channel estimation procedure for high rank transmissions with non-trivial performance loss.

Figure 4:
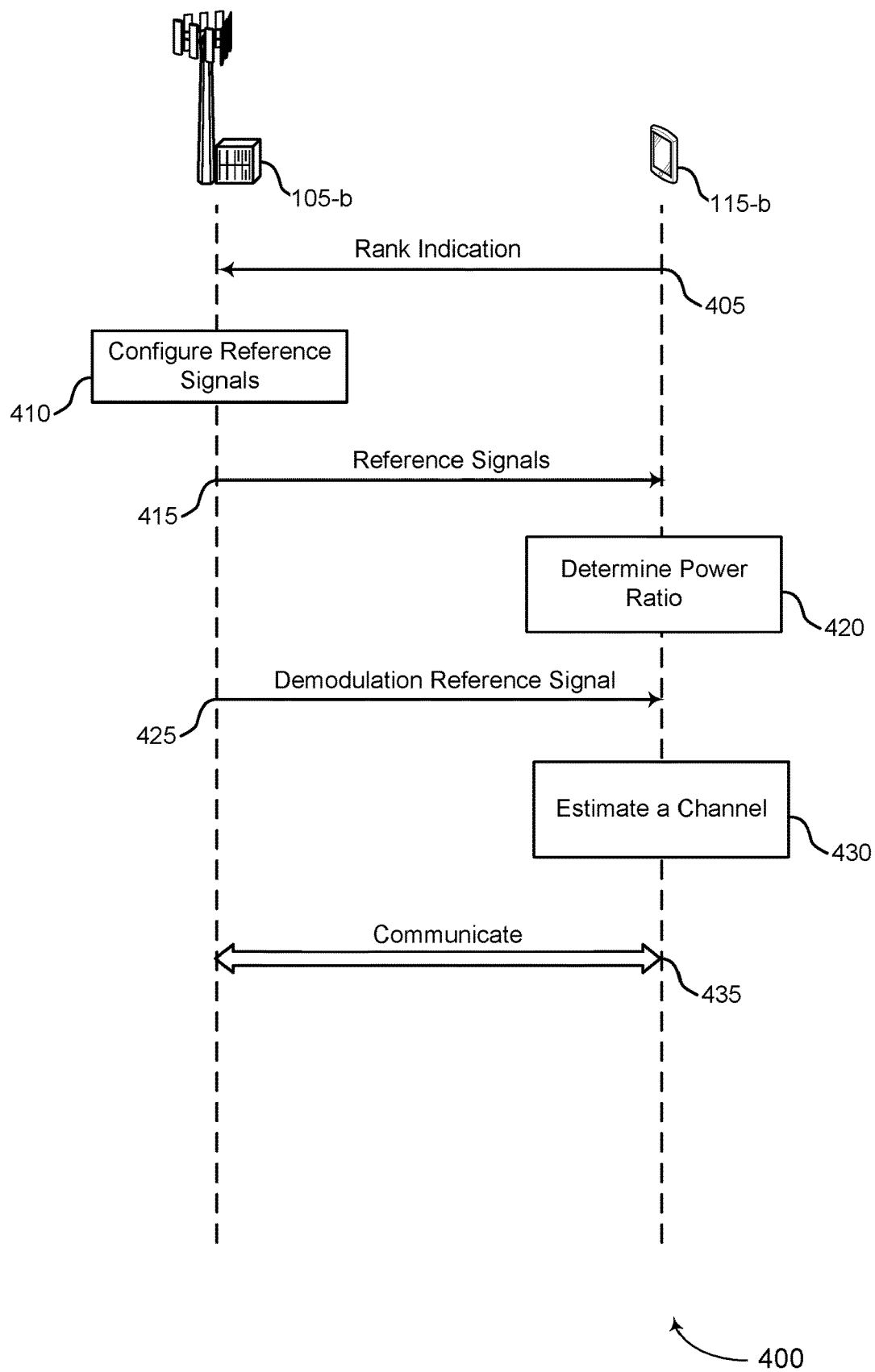
FIG. 4 illustrates an example of a process flow that supports multiple power references for high rank transmissions in accordance with aspects of the present disclosure.

FIG. 4 illustrates an example of a process flow 400 that supports multiple power references for high rank transmissions in accordance with aspects of the present disclosure. In some examples, the process flow 400 may implement aspects of wireless communications systems 100 and 200, as described with reference to FIGS. 1 and 2. For example, the process flow 400 may support methods for transmission of power references in high rank transmissions. In some examples, the multiple power references may include multiple power ratios associated with reference signals (for example, tracking reference signals). The process flow 400 may include a base station 105-*b* and a UE 115-*b*, which may be examples of the corresponding devices described with reference to FIGS. 1 and 2.

In the following description of the process flow 400, the operations performed by the base station 105-*b* and the UE 115-*b* may be performed in a different order or at different times than in the example shown. Some operations may also be omitted from the process flow 400, and other operations may be added to the process flow 400.

The UE 115-*b* may determine a rank associated with the UE 115-*b*. In some examples, the UE 115-*b* may determine that the rank is greater than a threshold. At 405, the UE 115-*b* may transmit an indication of the rank to the base station 105-*b*. At 410, the base station 105-*b* may receive the indication of the rank, and may proceed to configure a set of reference signals (for example, tracking reference signals) associated with a PDSCH based on receiving the indication of the rank. The base station 105-*b* may then transmit one or more of the set of reference signals to the UE 115-*b*, at 415. In some examples, each of the set of reference signals may be associated with a respective group of antenna ports for receiving the PDSCH.

At 420, the UE 115-*b* may receive the set of reference signals associated with the PDSCH from the base station 105-*b*, and may proceed to determine a power ratio for one or more of the respective groups of antenna ports. For example, the UE 115-*b* may determine a first energy of each resource element (for example, first EPRE) associated with the PDSCH and a second energy of each resource element (for example, second EPRE) associated with the reference signal of the set of reference signals. The UE 115-*b* may then determine a ratio between the first energy of each resource element and the second energy of each resource element.

At 425, the UE 115-*b* may receive a demodulation reference signal associated with the PDSCH from the base station 105-*b*. Upon receiving the demodulation reference signal, the UE 115-*b* may estimate a channel associated with the demodulation reference signal, at 430. In some implementations, the UE 115-*b* may estimate the channel based on the determined power ratios. At 435, the base station 105-*b* and the UE 115-*b* may communicate based on the estimated channel.

The operations performed by the base station 105-*b* and the UE 115-*b* as part of, but not limited to, process flow 400 may provide improvements to high rank transmission in wireless communications systems. Further the operations performed by the base station 105-*b* and the UE 115-*b* as part of, but not limited to, process flow 400 may provide benefits and enhancements to the operation of the UE 115-*b*. For example, the described reference signals in the process flow 400 may support enhanced estimation of signal-to-noise ratios in high rank transmission, among other advantages.

Figure 5:
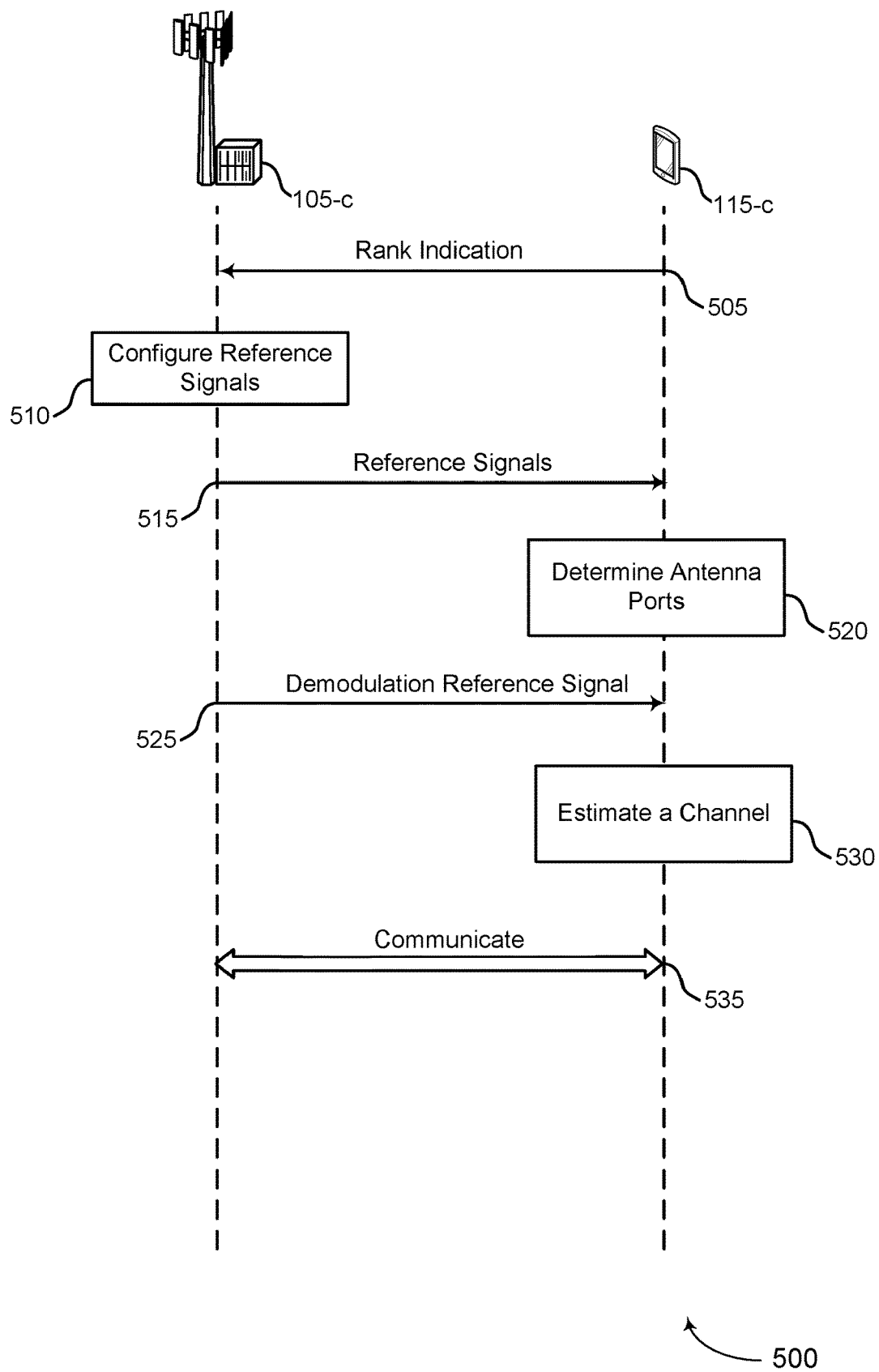
FIG. 5 illustrates an example of a process flow that supports multiple power references for high rank transmissions in accordance with aspects of the present disclosure.

FIG. 5 illustrates an example of a process flow 500 that supports multiple power references for high rank transmissions in accordance with aspects of the present disclosure. In some examples, the process flow 500 may implement aspects of wireless communications system 100. In some examples, the process flow 500 may implement aspects of wireless communications systems 100 and 200, as described with reference to FIGS. 1 and 2. For example, the process flow 500 may support methods for transmission of power references (such as power ratios), in high rank transmissions. The process flow 500 may include a base station 105-*c* and a UE 115-*c*, which may be examples of the corresponding devices described with reference to FIGS. 1 and 2.

In the following description of the process flow 500, the operations performed by the base station 105-*c* and the UE 115-*c* may be performed in a different order or at different times than in the example shown. Some operations may also be omitted from the process flow 500, and other operations may be added to the process flow 500.

The UE 115-*c* may determine a rank associated with the UE 115-*c*. In some examples, the UE 115-*c* may determine that the rank is greater than a threshold. At 505, the UE 115-*c* may transmit an indication of the rank to the base station 105-*c*.

At 510, the base station 105-*c* may identify (for example, by receiving or by determining itself) the indication of the rank, and may configure a set of reference signals (for example, tracking reference signals) associated with a set of reference signal ports based on the received indication of the rank. In some implementations, the set of reference signal ports may be associated with a demodulation reference signal. The base station 105-*c* may then transmit one or more of the set of reference signals to the UE 115-*c*, at 515.

At 520, the UE 115-*c* may receive the set of reference signals from the base station 105-*c*, and may proceed to determine a group of antenna ports based on the set of reference signal ports. For example, the UE 115-*c* may determine that the set of reference signal ports are quasi co-located for one or more parameters. The one or more parameters may include one or more of a doppler shift, a doppler spread, an average delay, or a delay spread, among others. In some implementations, the UE 115-*c* may determine that the set of reference signal ports are quasi co-located based on a quasi co-location type.

At 525, the UE 115-*c* may receive a demodulation reference signal associated with a PDSCH from the base station 105-*c*. At 530, upon receiving the demodulation reference signal, the UE 115-*c* may estimate a channel associated with the demodulation reference signal. In some implementations, the UE 115-*c* may estimate the channel based on the determined group of antenna ports. At 535, the base station 105-*c* and the UE 115-*c* may communicate based on the estimated channel.

The operations performed by the base station 105-*c* and the UE 115-*c* as part of, but not limited to, process flow 500 may provide improvements to high rank transmission in wireless communications systems. Further the operations performed by the base station 105-*c* and the UE 115-*c* as part of, but not limited to, process flow 500 may provide benefits and enhancements to the operation of the UE 115-*c* while performing high rank transmissions. For example, the described reference signals in the process flow 500 may support enhanced estimation of antenna ports in high rank transmission, among other advantages.

Figure 6:
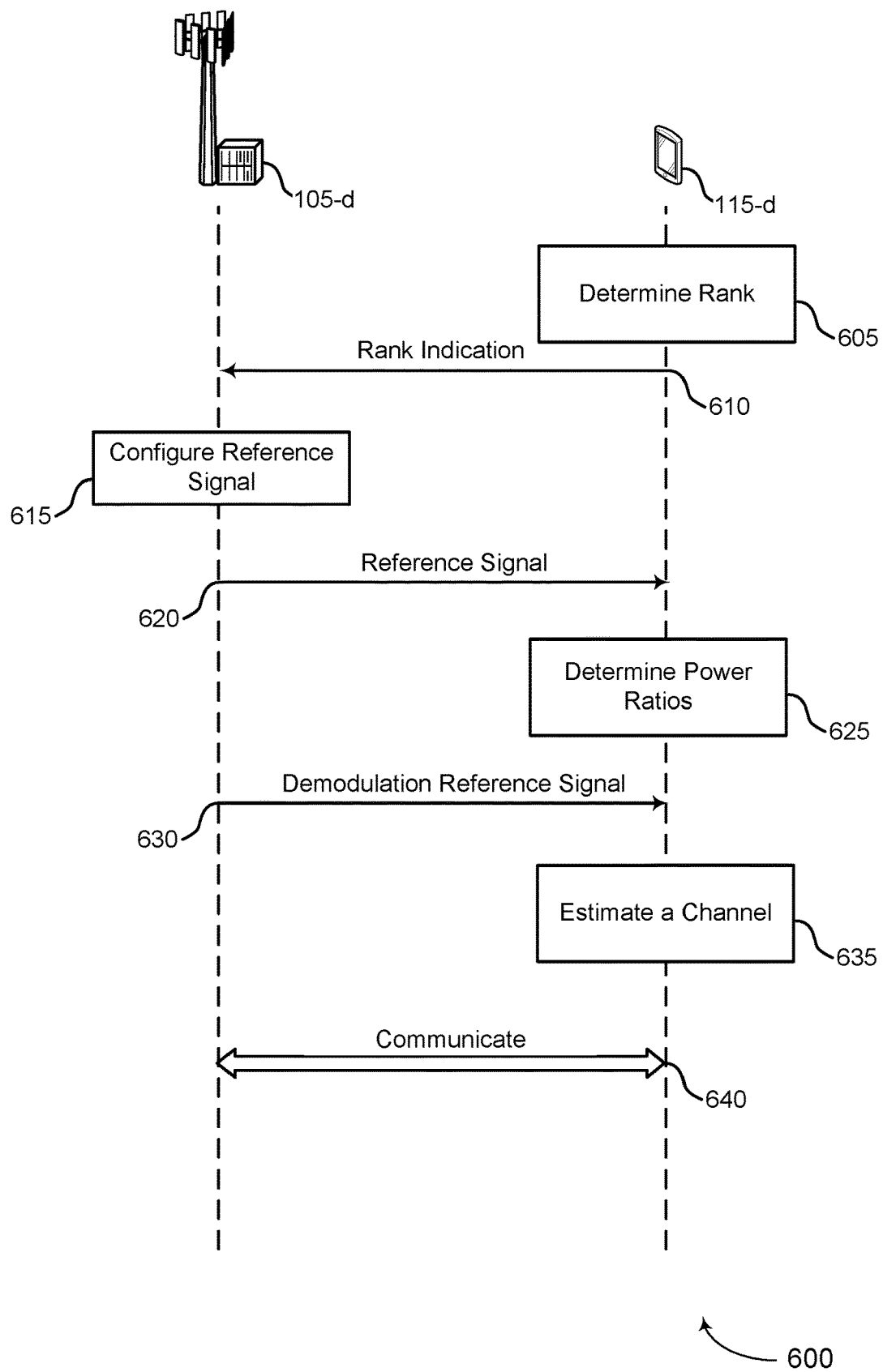
FIG. 6 illustrates an example of a process flow that supports multiple power references for high rank transmissions in accordance with aspects of the present disclosure.

FIG. 6 illustrates an example of a process flow 600 that supports multiple power references for high rank transmissions in accordance with aspects of the present disclosure. In some examples, the process flow 600 may implement aspects of wireless communications systems 100 and 200, as described with reference to FIGS. 1 and 2. For example, the process flow 600 may support methods for transmission of power references (such as power ratios), in high rank transmissions. The process flow 600 may include a base station 105-*d* and a UE 115-*d*, which may be examples of the corresponding devices described with reference to FIGS. 1 and 2.

In the following description of the process flow 600, the operations performed by the base station 105-*d* and the UE 115-*d* may be performed in a different order or at different times than in the example shown. Some operations may also be omitted from the process flow 600, and other operations may be added to the process flow 600.

At 605, the UE 115-*d* may determine a rank associated with the UE 115-*d*. In some examples, the UE 115-*d* may determine that the rank is greater than a threshold. At 610, the UE 115-*d* may transmit an indication of the rank to the base station 105-*d*.

At 615, the base station 105-*d* may receive the indication of the rank, and may proceed to configure a reference signal (for example, a tracking reference signal) based on determining that the rank indicated by the UE 115-*d* is greater than the threshold. In some implementations, the reference signal may be associated with a set of power ratios.

At 620, the base station 105-*d* may transmit the reference signal associated with a set of power ratios based on the received indication of the rank. The UE 115-*d* may receive the reference signal associated with the set of power ratios based on the transmitted indication of the rank. In some examples, each of the set of power ratios may be associated with a respective group of antenna ports.

At 625, the UE 115-*d* may determine one or more power ratios of the set of power ratios. For example, the UE 115-*d* may determine a first energy of each resource element (for example, a first EPRE) associated with a PDSCH and a second energy of each resource element (for example, a second EPRE) associated with the reference signal. The UE 115-*d* may then determine the power ratio as a ratio between the first energy of each resource element and the second energy of each resource element.

At 630, the UE 115-*d* may receive a demodulation reference signal associated with the PDSCH from the base station 105-*d*. At 635, upon receiving the demodulation reference signal, the UE 115-*d* may estimate a channel associated with the demodulation reference signal. At 640, the base station 105-*d* and the UE 115-*d* may communicate based on the estimated channel.

The operations performed by the base station 105-*d* and the UE 115-*d* as part of, but not limited to, process flow 600 may provide improvements to high rank transmission in wireless communications systems. Further the operations performed by the base station 105-*d* and the UE 115-*d* as part of, but not limited to, process flow 600 may provide benefits and enhancements to the operation of the UE 115-*d*.

Figure 7:
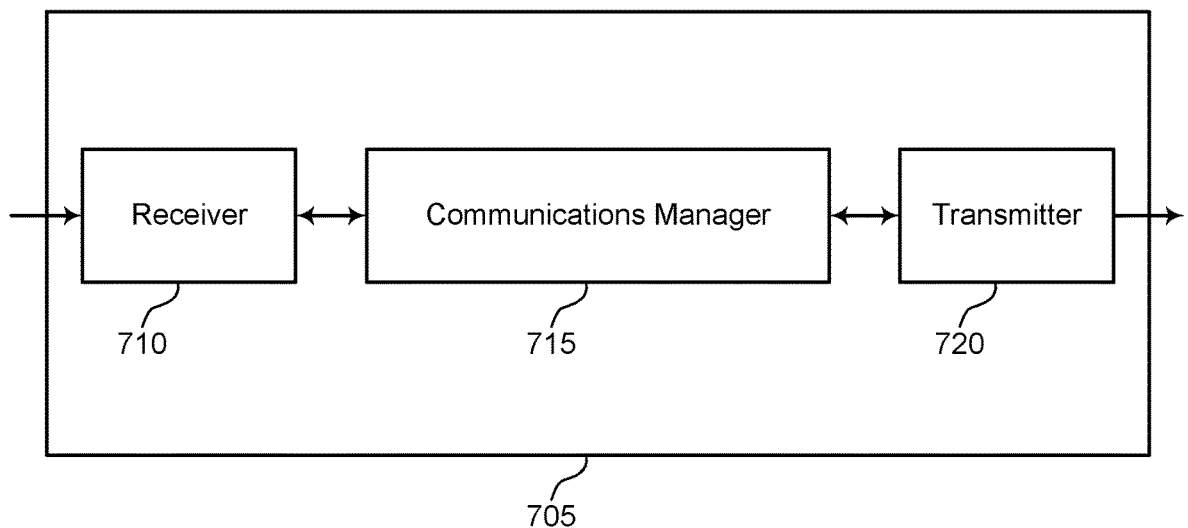
FIGS. 7 and 8 show block diagrams of devices that support multiple power references for high rank transmissions in accordance with aspects of the present disclosure.

FIG. 7 shows a block diagram of a device 705 that supports multiple power references for high rank transmissions in accordance with aspects of the present disclosure. The device 705 may be an example of aspects of a UE 115 as described with reference to FIG. 1 The device 705 may include a receiver 710, a communications manager 715, and a transmitter 720. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to multiple power references for high rank transmissions). Information may be passed on to other components of the device 705. The receiver 710 may be an example of aspects of the transceiver 1020 described with reference to FIG. 10. The receiver 710 may utilize a set of antennas.

The communications manager 715 may receive, from a base station, a set of reference signals associated with a PDSCH and determine a power ratio for one or more of the respective groups of antenna ports based on one or more of the set of reference signals. In some implementations, each of the set of reference signals may be associated with a respective group of antenna ports for receiving the PDSCH. The communications manager 715 may receive, from the base station, a demodulation reference signal associated with the PDSCH, estimate a channel associated with the demodulation reference signal based on determining the power ratio, and communicate, with the base station, based on estimating the channel.

Additionally or alternatively, the communications manager 715 may receive, from the base station, a reference signal associated with a set of reference signal ports associated with a demodulation reference signal and determine a group of antenna ports based on the set of reference signal ports. The communications manager 715 may then receive, from the base station, the demodulation reference signal associated with a PDSCH, estimate a channel associated with the demodulation reference signal based on determining the group of antenna ports, and communicate, with the base station, based on estimating the channel.

Additionally or alternatively, the communications manager 715 may determine a rank associated with the UE, transmit, to a base station, an indication of the rank associated with the UE, and receive, from the base station, a reference signal associated with a set of power ratios based on transmitting the indication of the rank. In some implementations, each of the set of power ratios is associated with a respective group of antenna ports. The communications manager 715 may then receive, from the base station, a demodulation reference signal associated with a PDSCH, estimate a channel associated with the demodulation reference signal based on receiving the reference signal, and communicate, with the base station, based on estimating the channel.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a set of antennas.

The actions performed by the communications manager 715 may be implemented to realize one or more potential advantages. In some implementations, the communications manager 715 may enhance channel estimation procedure (for example, by increasing communication reliability) for high rank transmissions with non-trivial performance loss at a UE 115, by allowing the UE 115 to use multiple power references for high rank transmissions. The improvements in the channel estimation procedure (for example, increasing communication reliability) may further save power and increase battery life at a UE 115 (for example, by reducing complexity and increasing the accuracy of signal-to-noise ratio calculations).

Figure 8:
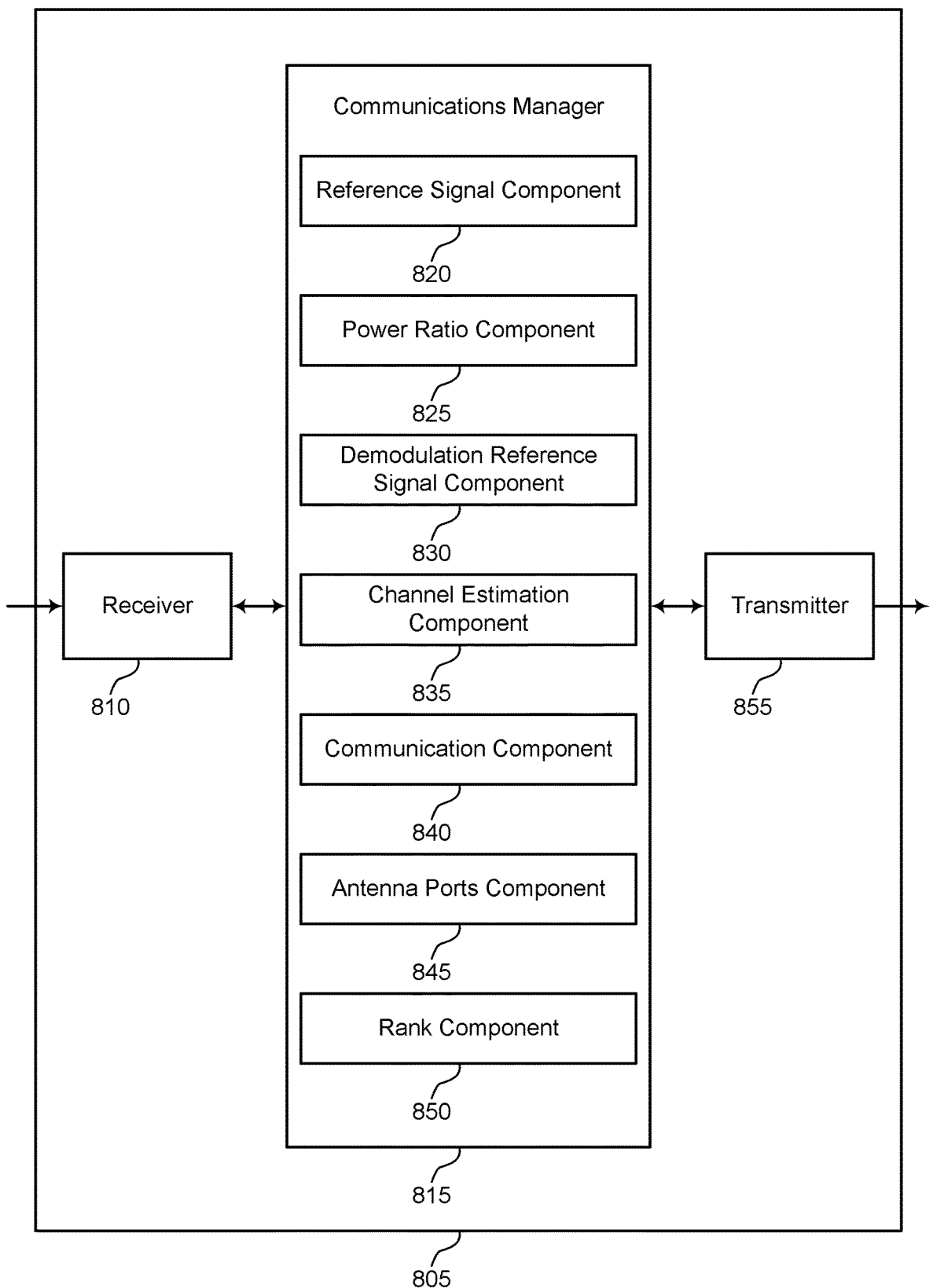

FIG. 8 shows a block diagram of a device 805 that supports multiple power references for high rank transmissions in accordance with aspects of the present disclosure. The device 805 may be an example of aspects of a device 705, or a UE 115 as described with reference to FIG. 1. The device 805 may include a receiver 810, a communications manager 815, and a transmitter 855. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to multiple power references for high rank transmissions). Information may be passed on to other components of the device 805. The receiver 810 may be an example of aspects of the transceiver 1020 described with reference to FIG. 10. The receiver 810 may utilize a set of antennas.

The communications manager 815 may be an example of aspects of the communications manager 715 as described with reference to FIG. 7. The communications manager 815 may include a reference signal component 820, a power ratio component 825, a demodulation reference signal component 830, a channel estimation component 835, a communication component 840, an antenna ports component 845, and a rank component 850. The communications manager 815 may be an example of aspects of the communications manager 1010 described herein.

In some examples, the reference signal component 820 may receive, from a base station, a set of reference signals associated with a PDSCH. In some examples, each of the set of reference signals is associated with a respective group of antenna ports for receiving the PDSCH. The power ratio component 825 may determine a power ratio for one or more of the respective groups of antenna ports based on one or more of the set of reference signals. The demodulation reference signal component 830 may receive, from the base station, a demodulation reference signal associated with the PDSCH. The channel estimation component 835 may estimate a channel associated with the demodulation reference signal based on determining the power ratio. The communication component 840 may communicate, with the base station, based on estimating the channel.

In other examples, the reference signal component 820 may receive, from a base station, a reference signal associated with a set of reference signal ports associated with a demodulation reference signal. The antenna ports component 845 may determine a group of antenna ports based on the set of reference signal ports. The demodulation reference signal component 830 may receive, from the base station, the demodulation reference signal associated with a PDSCH. The channel estimation component 835 may estimate a channel associated with the demodulation reference signal based on determining the group of antenna ports. The communication component 840 may communicate, with the base station, based on estimating the channel. The rank component 850 may determine a rank associated with the UE and transmit, to a base station, an indication of the rank associated with the UE.

In other examples, the reference signal component 820 may receive, from the base station, a reference signal associated with a set of power ratios based on transmitting the indication of the rank. In some examples, each of the set of power ratios is associated with a respective group of antenna ports. The demodulation reference signal component 830 may receive, from the base station, a demodulation reference signal associated with a PDSCH. The channel estimation component 835 may estimate a channel associated with the demodulation reference signal based on receiving the reference signal. The communication component 840 may communicate, with the base station, based on estimating the channel.

The transmitter 855 may transmit signals generated by other components of the device 805. In some examples, the transmitter 855 may be collocated with a receiver 810 in a transceiver component. For example, the transmitter 855 may be an example of aspects of the transceiver 1020 described with reference to FIG. 10. The transmitter 855 may utilize a set of antennas.

A processor of a UE 115 (for example, controlling the receiver 810, the transmitter 855, or the transceiver 1020 as described with reference to FIG. 10) may enhance channel estimation procedure and increase communication reliability by implementing multiple power references for high rank transmissions (for example, via implementation of system components described with reference to FIG. 8). Further, the processor of UE 115 may receive one or more of multiple single-port tracking reference signals, a single multi-port tracking reference signal, or a tracking reference signal associated with multiple power ratios, to perform the processes described herein. The processor of the UE 115 may perform the processes described herein to improve communication reliability to further save power and increase battery life at the UE 115 (for example, by reducing complexity and increasing the accuracy of signal-to-noise ratio calculations).

Figure 9:
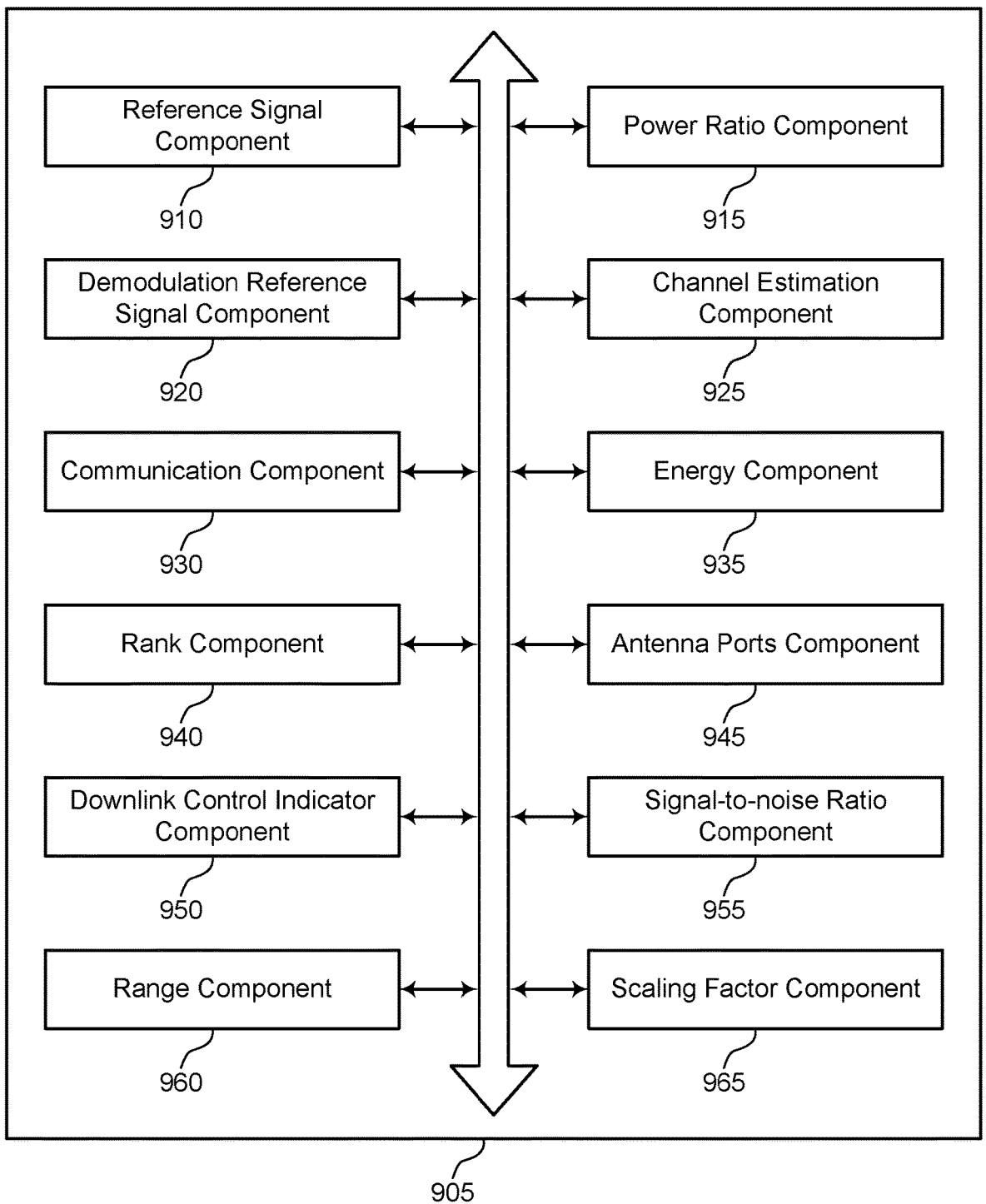
FIG. 9 shows a block diagram of a communications manager that supports multiple power references for high rank transmissions in accordance with aspects of the present disclosure.

FIG. 9 shows a block diagram of a communications manager 905 that supports multiple power references for high rank transmissions in accordance with aspects of the present disclosure. The communications manager 905 may be an example of aspects of a communications manager 715, a communications manager 815, or a communications manager 1010 described herein. The communications manager 905 may include a reference signal component 910, a power ratio component 915, a demodulation reference signal component 920, a channel estimation component 925, a communication component 930, an energy component 935, a rank component 940, an antenna ports component 945, a downlink control indicator component 950, a signal-to-noise ratio component 955, a range component 960, and a scaling factor component 965. Each of these components may communicate, directly or indirectly, with one another (for example, via one or more buses).

The reference signal component 910 may receive, from a base station, a set of reference signals associated with a PDSCH. In some examples, each of the set of reference signals is associated with a respective group of antenna ports for receiving the PDSCH. The power ratio component 915 may determine a power ratio for one or more of the respective groups of antenna ports based on one or more of the set of reference signals. The demodulation reference signal component 920 may receive, from the base station, a demodulation reference signal associated with the PDSCH. The channel estimation component 925 may estimate a channel associated with the demodulation reference signal based on determining the power ratio. The communication component 930 may communicate, with the base station, based on estimating the channel.

In some examples, the reference signal component 910 may receive a first reference signal associated with the PDSCH and a second reference signal associated with the PDSCH. In some examples, the first reference signal is quasi co-located with the second reference signal. In some implementations, one or more reference signals include one or more of a tracking reference signal. The energy component 935 may determine a first energy of each resource element associated with the PDSCH. In some examples, the energy component 935 may determine a second energy of each resource element associated with one or more reference signals of the set of reference signals. In some examples, the energy component 935 may determine a ratio between the first energy of each resource element and the second energy of each resource element. In some examples, the power ratio component 915 may determine the power ratio based on the ratio between the first energy of each resource element and the second energy of each resource element.

The rank component 940 may determine a rank associated with the UE. In some examples, the rank component 940 may transmit, to a base station, an indication of the rank associated with the UE. In some implementations, receiving the set of reference signals may be based on transmitting the indication of the rank. In some examples, the rank component 940 may determine that a rank associated with the UE is greater than a threshold. In some implementations, receiving the set of reference signals is further based on determining that the rank associated with the UE is greater than the threshold.

In some examples, the reference signal component 910 may determine that a first reference signal and a second reference signal are quasi co-located for one or more parameters based on a source identifier. In some example implementations, receiving the set of reference signals further includes receiving the first reference signal associated with the PDSCH and the second reference signal associated with the PDSCH. In some examples, the reference signal component 910 may receive one or more resources associated with the first reference signal and one or more resources associated with the second reference signal on the same symbol. In some implementations, the one or more parameters include one or more of a doppler shift, a doppler spread, an average delay, or a delay spread. In some examples, the source identifier includes one or more of a synchronization signal block identifier or a quasi co-location identifier configured by the base station using a radio resource control configuration.

The antenna ports component 945 may determine one or more antenna ports for receiving the demodulation reference signal based on the received set of reference signals. In some implementations, a first reference signal of the set of reference signals includes a periodic reference signal and a second reference signal of the set of reference signals includes an aperiodic reference signal. The downlink control indicator component 950 may receive, from the base station, a downlink control indicator. In some examples, the downlink control indicator component 950 may identify a bit included in the downlink control indicator. In some implementations, receiving the second reference signal is based on identifying the bit included in the downlink control indicator. In some implementations, the second reference signal includes a second power ratio. In some examples, a quantity of the set of reference signals is less than or equal to a quantity of antenna ports. In some examples, the reference signal component 910 may receive the power ratio in one or more reference signals of the set of reference signals. In some implementations, determining the power ratio for one or more of the respective groups of antenna ports is based on receiving the power ratio in the one or more reference signals. In some examples, determining the power ratio for one or more of the respective groups of antenna ports further includes determining the power ratio for each of the respective groups of antenna ports.

In other examples, the reference signal component 910 may receive, from a base station, a reference signal associated with a set of reference signal ports associated with a demodulation reference signal. In some examples, the set of reference signals are associated with a same PDSCH and a single frequency network configuration. The antenna ports component 945 may determine a group of antenna ports based on the set of reference signal ports. In some examples, the demodulation reference signal component 920 may receive, from the base station, the demodulation reference signal associated with a PDSCH. In some examples, the channel estimation component 925 may estimate a channel associated with the demodulation reference signal based on determining the group of antenna ports. In some examples, the communication component 930 may communicate, with the base station, based on estimating the channel.

In some examples, the rank component 940 may determine a rank associated with the UE. In some examples, the rank component 940 may transmit, to the base station, an indication of the rank associated with the UE. In some implementations, receiving the set of reference signals is further based on transmitting the indication of the rank. In some examples, the rank component 940 may determine that a rank associated with the UE is greater than a threshold. In some examples, receiving the reference signal is further based on determining that the rank associated with the UE is greater than the threshold.

In some examples, the reference signal component 910 may determine that the set of reference signal ports are quasi co-located for one or more parameters. According to some implementations, estimating the channel is based on determining that the set of reference signal ports are quasi co-located. In some examples, the reference signal component 910 may determine that the set of reference signal ports are quasi co-located based on a quasi co-location type. In some examples, estimating the channel is based on determining that the set of reference signal ports are quasi co-located. In some examples, the one or more parameters include one or more of a doppler shift, a doppler spread, an average delay, or a delay spread. In some examples, the one or more parameters are different than an average gain. In some examples, the antenna ports component 945 may determine that the group of antenna ports and each of the set of reference signal ports are quasi co-located for one or more parameters. In some examples, estimating the channel is based on determining that the group of antenna ports and each of the set of reference signal ports are quasi co-located. In such examples, the one or more parameters include an average gain.

In some examples, the antenna ports component 945 may determine one or more antenna ports for receiving the demodulation reference signal based on the received reference signal. The signal-to-noise ratio component 955 may determine a signal-to-noise ratio for an antenna port of the group of antenna ports. In some implementations, estimating the channel associated with the demodulation reference signal is based on determining the signal-to-noise ratio. In some implementations, the signal-to-noise ratio includes an average signal-to-noise ratio for the antenna port included in the group of antenna ports. In some examples, the reference signal includes an aperiodic reference signal. In some examples, one or more reference signals include one or more of a tracking reference signal.

In other examples, the rank component 940 may determine a rank associated with the UE, and may transmit, to a base station, an indication of the rank associated with the UE. In some examples, the reference signal component 910 may receive, from the base station, a reference signal associated with a set of power ratios based on transmitting the indication of the rank. In some examples, each of the set of power ratios is associated with a respective group of antenna ports. In some implementations, one or more reference signals include one or more of a tracking reference signal. In some examples, the demodulation reference signal component 920 may receive, from the base station, a demodulation reference signal associated with a PDSCH. In some examples, the channel estimation component 925 may estimate a channel associated with the demodulation reference signal based on receiving the reference signal. In some examples, the communication component 930 may communicate, with the base station, based on estimating the channel.

In some examples, the energy component 935 may determine a first energy of each resource element associated with the PDSCH. In some examples, the energy component 935 may determine a second energy of each resource element associated with one or more reference signals. In some examples, the energy component 935 may determine a ratio between the first energy of each resource element and the second energy of each resource element. In some examples, the power ratio component 915 may determine a first power ratio associated with a first group of antenna ports based on the reference signal. In some examples, the power ratio component 915 may determine a second power ratio associated with a second group of antenna ports based on the reference signal. In some implementations, the first power ratio and the second power ratio are included in the set of power ratios, and the first group of antenna ports is different than the second group of antenna ports.

In some examples, the power ratio component 915 may determine a first power ratio associated with a first group of antenna ports based on the reference signal. In some examples, the power ratio component 915 may determine a second power ratio associated with a second group of antenna ports based on the reference signal. In some example implementations, the second group of antenna ports is a subset of the first group of antenna ports. In some examples, the power ratio component 915 may determine the second power ratio based on the first power ratio. The range component 960 may determine that a first range associated with the first power ratio is different than a second range associated with the second power ratio. In some implementations, estimating the channel is based on the first range associated with the first power ratio and the second range associated with the second power ratio.

In some examples, the reference signal component 910 may receive, from the base station, a configuration message and a control indication. In some examples, receiving the reference signal is based on the configuration message. In some implementations, the control indication includes one or more of a downlink control indicator or a media access layer control element. In some implementations, the configuration message includes a radio resource control configuration. The scaling factor component 965 may determine a scaling factor associated with a group of antenna ports based on receiving the control indication in which estimating the channel is based on determining the scaling factor associated with the group of antenna ports.

In some examples, the antenna ports component 945 may determine the group of antenna ports from an antenna port table based on determining the scaling factor. In some example implementations, estimating the channel is based on determining the group of antenna ports, in which the antenna port table includes a first group of antenna ports associated with a first scaling factor and a second group of antenna ports associated with a second scaling factor that is different than the second scaling factor. In some examples, the antenna ports component 945 may determine one or more antenna ports for receiving the demodulation reference signal based on the received reference signal. In some examples, the rank component 940 may determine that the rank associated with the UE is greater than a threshold, in which receiving the reference signal associated with the set of power ratios is based on determining that the rank associated with the UE is greater than the threshold.

Figure 10:
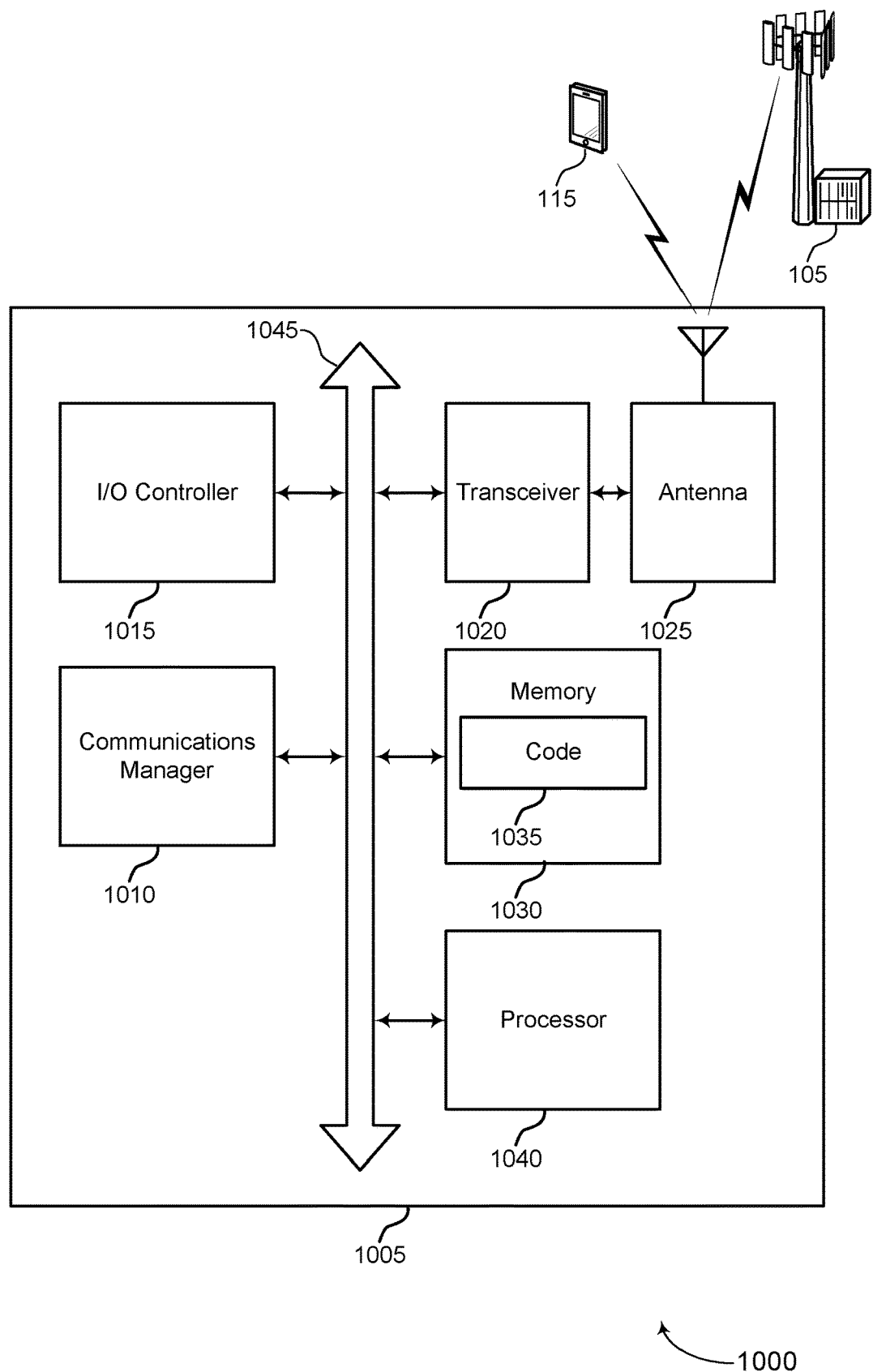
FIG. 10 shows a diagram of a system including a device that supports multiple power references for high rank transmissions in accordance with aspects of the present disclosure.

FIG. 10 shows a diagram of a system 1000 including a device 1005 that supports multiple power references for high rank transmissions in accordance with aspects of the present disclosure. The device 1005 may be an example of or include the components of device 705, device 805, or a UE 115 as described with reference to FIG. 1. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (for example, bus 1045).

The communications manager 1010 may receive, from a base station, a set of reference signals associated with a PDSCH. In some examples, each of the set of reference signals is associated with a respective group of antenna ports for receiving the PDSCH. The communications manager 1010 may determine a power ratio for one or more of the respective groups of antenna ports based on one or more of the set of reference signals, receive, from the base station, a demodulation reference signal associated with the PDSCH, estimate a channel associated with the demodulation reference signal based on determining the power ratio, and communicate, with the base station, based on estimating the channel.

In other examples, the communications manager 1010 may receive, from a base station, a reference signal associated with a set of reference signal ports associated with a demodulation reference signal. The communications manager 1010 may determine a group of antenna ports based on the set of reference signal ports, receive, from the base station, the demodulation reference signal associated with a PDSCH, estimate a channel associated with the demodulation reference signal based on determining the group of antenna ports, and communicate, with the base station, based on estimating the channel.

In other examples, the communications manager 1010 may determine a rank associated with the UE, and transmit, to a base station, an indication of the rank associated with the UE. The communications manager 1010 may also receive, from the base station, a reference signal associated with a set of power ratios based on transmitting the indication of the rank, in which each of the set of power ratios is associated with a respective group of antenna ports, receive, from the base station, a demodulation reference signal associated with a PDSCH, estimate a channel associated with the demodulation reference signal based on receiving the reference signal, and communicate, with the base station, based on estimating the channel.

The I/O controller 1015 may manage input and output signals for the device 1005. The I/O controller 1015 may also manage peripherals not integrated into the device 1005. In some implementations, the I/O controller 1015 may represent a physical connection or port to an external peripheral. In some implementations, the I/O controller 1015 may utilize an operating system such as iOS®, ANDROID®, MS-DOS®, MS-WINDOWS®, OS/2®, UNIX®, LINUX®, or another known operating system. In other implementations, the I/O controller 1015 may represent or interact with a modem, a keyboard, a mouse, a touchscreen, or a similar device. In some implementations, the I/O controller 1015 may be implemented as part of a processor. In some implementations, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some implementations, the wireless device may include a single antenna 1025 or a set of antennas. However, in some examples the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some implementations, the memory 1030 may contain, among other things, a basic input/basic output system (BIOS) which may control basic hardware or software operation such as the interaction with peripheral components or devices.

The processor 1040 may include an intelligent hardware device, (for example, a general-purpose processor, a digital signal processor (DSP), a CPU, a microcontroller, an ASIC, an FPGA, a programmable logic device, a discrete gate or transistor logic component, a discrete hardware component, or any combination thereof). In some implementations, the processor 1040 may be configured to operate a memory array using a memory controller. In other implementations, a memory controller may be integrated into the processor 1040. The processor 1040 may be configured to execute computer-readable instructions stored in a memory (for example, the memory 1030) to cause the device 1005 to perform various functions (for example, functions or tasks supporting multiple power references for high rank transmissions).

The code 1035 may include instructions to implement aspects of the present disclosure, including instructions to support wireless communications. The code 1035 may be stored in a non-transitory computer-readable medium such as system memory or other type of memory. In some implementations, the code 1035 may not be directly executable by the processor 1040 but may cause a computer (for example, when compiled and executed) to perform functions described herein.

Figure 11:
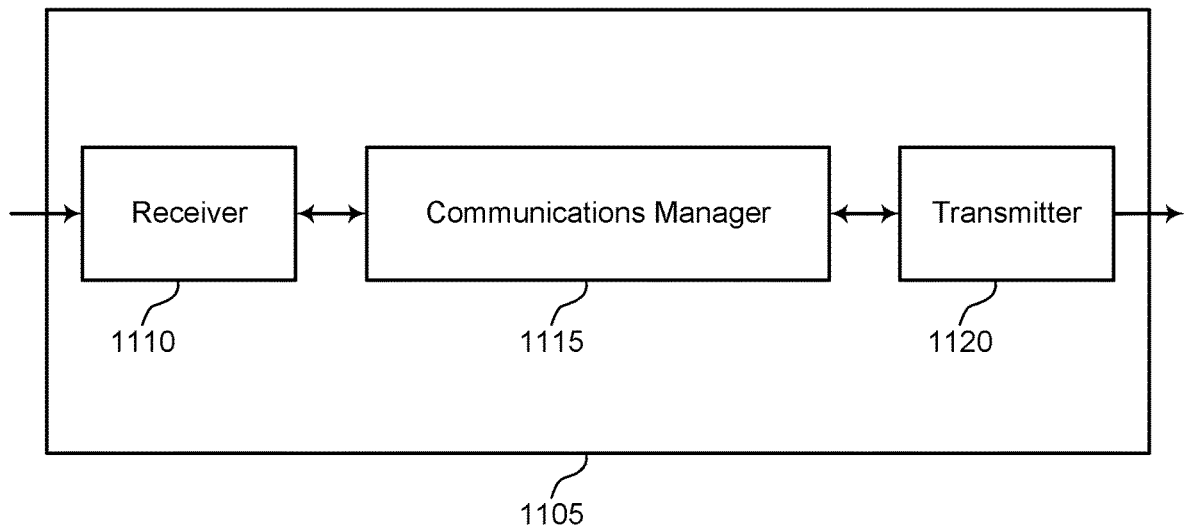
FIGS. 11 and 12 show block diagrams of devices that support multiple power references for high rank transmissions in accordance with aspects of the present disclosure.

FIG. 11 shows a block diagram of a device 1105 that supports multiple power references for high rank transmissions in accordance with aspects of the present disclosure. The device 1105 may be an example of aspects of a base station 105 as described with reference to FIG. 1. The device 1105 may include a receiver 1110, a communications manager 1115, and a transmitter 1120. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to multiple power references for high rank transmissions). Information may be passed on to other components of the device 1105. The receiver 1110 may be an example of aspects of the transceiver 1420 described with reference to FIG. 14. The receiver 1110 may utilize a set of antennas.

The communications manager 1115 may receive, from a UE, an indication of a rank associated with the UE, transmit, to the UE, a set of reference signals associated with a PDSCH based on receiving the indication of the rank, and communicate, with the UE, based on transmitting the set of reference signals. In some implementations, each of the set of reference signals is associated with a respective group of antenna ports for receiving the PDSCH. In other examples, the communications manager 1115 may receive, from a UE, an indication of a rank associated with the UE, transmit, to the UE, a reference signal associated with a set of reference signal ports based on receiving the indication of the rank, configure a group of antenna ports based on the set of reference signal ports, and communicate, with the UE, based on determining the group of antenna ports.

Additionally or alternatively, the communications manager 1115 may receive, from a UE, an indication of a rank associated with the UE, transmit, to the UE, a reference signal associated with a set of power ratios based on receiving the indication of the rank, and communicate, with the UE, based on transmitting the reference signal associated with a set of power ratios. In some implementations, each of the set of power ratios is associated with a respective group of antenna ports. The communications manager 1115 may be an example of aspects of the communications manager 1410 described herein.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a set of antennas.

Figure 12:
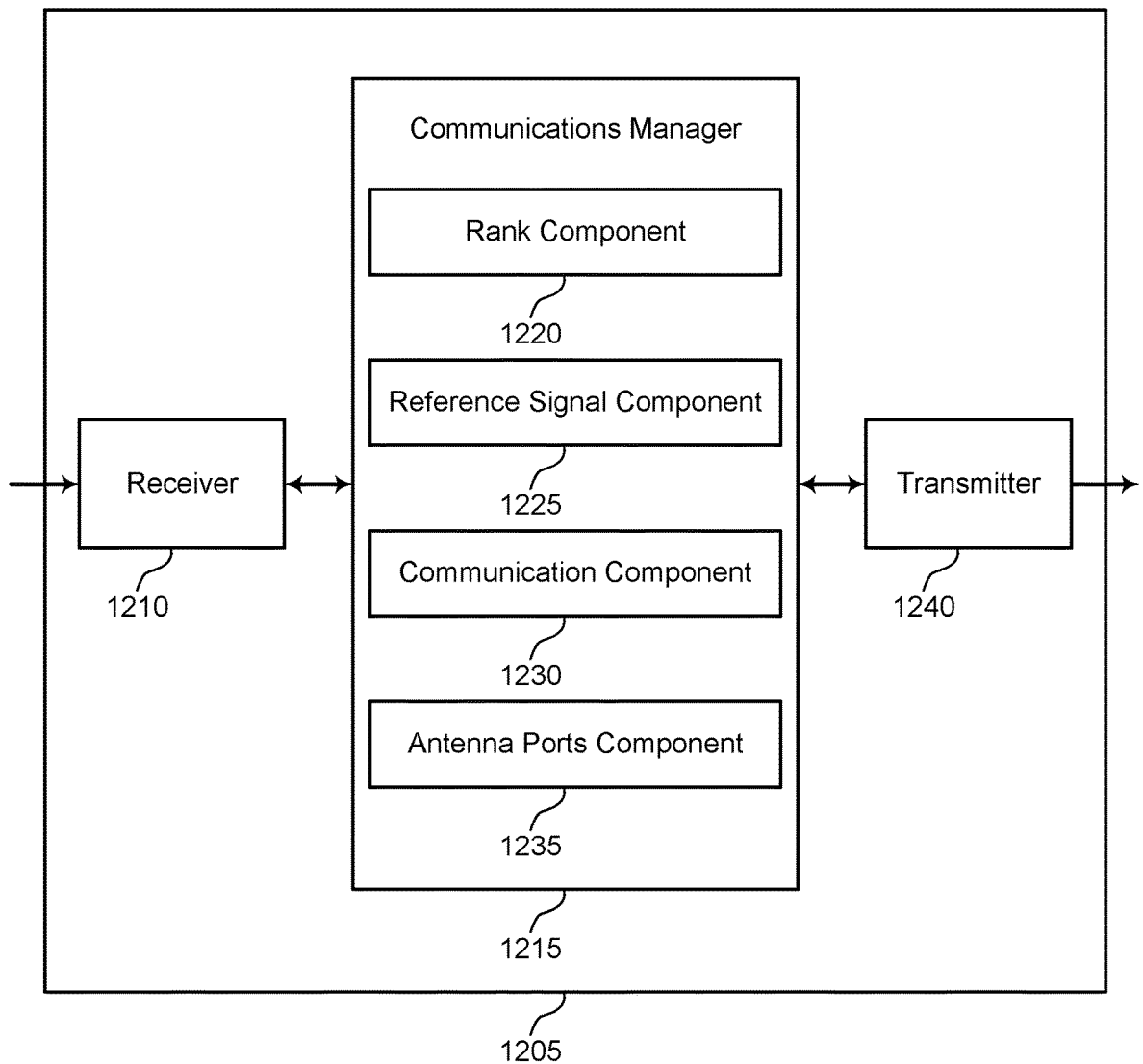

FIG. 12 shows a block diagram of a device 1205 that supports multiple power references for high rank transmissions in accordance with aspects of the present disclosure. The device 1205 may be an example of aspects of a device 1105, or a base station 105 as described with reference to FIG. 1. The device 1205 may include a receiver 1210, a communications manager 1215, and a transmitter 1240. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to multiple power references for high rank transmissions). Information may be passed on to other components of the device 1205. The receiver 1210 may be an example of aspects of the transceiver 1420 described with reference to FIG. 14. The receiver 1210 may utilize a set of antennas.

The communications manager 1215 may be an example of aspects of the communications manager 1115 as described with reference to FIG. 11. The communications manager 1215 may include a rank component 1220, a reference signal component 1225, a communication component 1230, and an antenna ports component 1235. The communications manager 1215 may be an example of aspects of the communications manager 1410 described herein.

The rank component 1220 may receive, from a UE, an indication of a rank associated with the UE. The reference signal component 1225 may transmit, to the UE, a set of reference signals associated with a PDSCH based on receiving the indication of the rank. In some implementations, each of the set of reference signals may be associated with a respective group of antenna ports for receiving the PDSCH. The communication component 1230 may communicate, with the UE, based on transmitting the set of reference signals.

In other examples, the rank component 1220 may receive, from a UE, an indication of a rank associated with the UE. The reference signal component 1225 may transmit, to the UE, a reference signal associated with a set of reference signal ports based on receiving the indication of the rank. The antenna ports component 1235 may configure a group of antenna ports based on the set of reference signal ports. The communication component 1230 may communicate, with the UE, based on determining the group of antenna ports.

In other examples, the rank component 1220 may receive, from a UE, an indication of a rank associated with the UE. The reference signal component 1225 may transmit, to the UE, a reference signal associated with a set of power ratios based on receiving the indication of the rank. In some implementations, each of the set of power ratios may be associated with a respective group of antenna ports. The communication component 1230 may communicate, with the UE, based on transmitting the reference signal associated with a set of power ratios.

The transmitter 1240 may transmit signals generated by other components of the device 1205. In some examples, the transmitter 1240 may be collocated with a receiver 1210 in a transceiver component. For example, the transmitter 1240 may be an example of aspects of the transceiver 1420 described with reference to FIG. 14. The transmitter 1240 may utilize a set of antennas.

Figure 13:
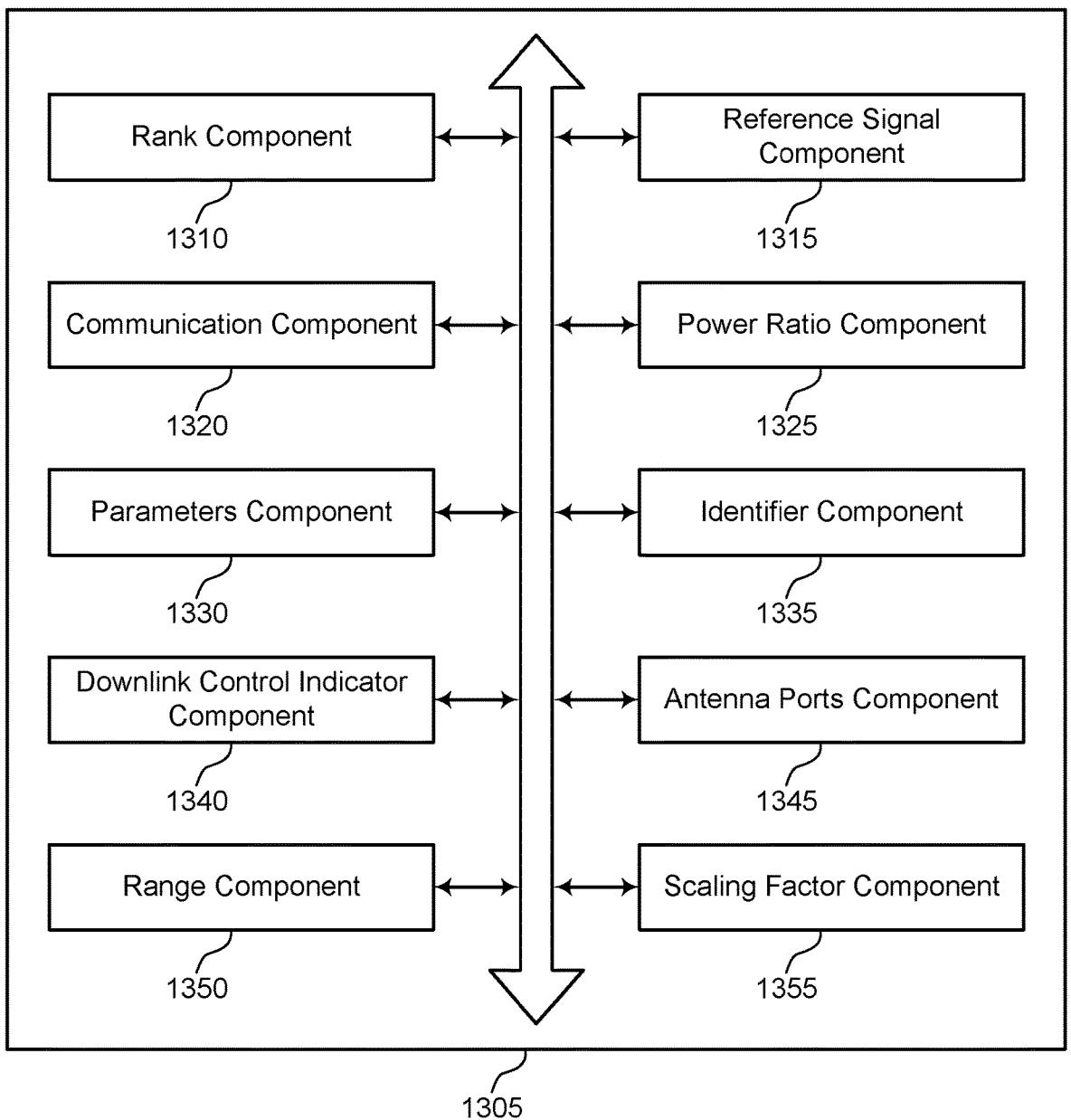
FIG. 13 shows a block diagram of a communications manager that supports multiple power references for high rank transmissions in accordance with aspects of the present disclosure.

FIG. 13 shows a block diagram of a communications manager 1305 that supports multiple power references for high rank transmissions in accordance with aspects of the present disclosure. The communications manager 1305 may be an example of aspects of a communications manager 1115, a communications manager 1215, or a communications manager 1410 described herein. The communications manager 1305 may include a rank component 1310, a reference signal component 1315, a communication component 1320, a power ratio component 1325, a parameters component 1330, an identifier component 1335, a downlink control indicator component 1340, an antenna ports component 1345, a range component 1350, and a scaling factor component 1355. Each of these components may communicate, directly or indirectly, with one another (for example, via one or more buses).

The rank component 1310 may receive, from a UE, an indication of a rank associated with the UE. The reference signal component 1315 may transmit, to the UE, a set of reference signals associated with a PDSCH based on receiving the indication of the rank. In some implementations, each of the set of reference signals may be associated with a respective group of antenna ports for receiving the PDSCH. In some examples, one or more reference signals include one or more of a tracking reference signal. The communication component 1320 may communicate, with the UE, based on transmitting the set of reference signals.

In some examples, transmitting the set of reference signals further includes transmitting a first reference signal associated with the PDSCH and a second reference signal associated with the PDSCH, in which the first reference signal is quasi co-located with the second reference signal. In some examples, the rank component 1310 may determine the rank associated with the UE based on the indication of the rank associated with the UE. In some implementations, transmitting the reference signal is further based on determining the rank associated with the UE. In some implementations, a reference signal of the set of reference signals includes a power ratio for one or more of the respective groups of antenna ports.

In some examples, the reference signal component 1315 may transmit a first reference signal associated with the PDSCH and a second reference signal associated with the PDSCH, in which the first reference signal and the second reference signal are quasi co-located for one or more parameters based on a source identifier. In some examples, the reference signal component 1315 may transmit one or more resources associated with the first reference signal and one or more resources associated with the second reference signal on the same symbol, in which communicating with the UE is based on transmitting the one or more resources. The parameters component 1330 may identify the one or more parameters. In some implementations, the one or more parameters include one or more of a doppler shift, a doppler spread, an average delay, or a delay spread. The identifier component 1335 may identify the source identifier. In some implementations, the source identifier includes one or more of a synchronization signal block identifier or a quasi co-location identifier configured by the base station using a radio resource control configuration. In some examples, a first reference signal of the set of reference signals includes a periodic reference signal and a second reference signal of the set of reference signals includes an aperiodic reference signal.

The downlink control indicator component 1340 may set a bit included in a downlink control indicator to indicate one or more resources associated with the second reference signal. In some examples, the downlink control indicator component 1340 may transmit, to the UE, the downlink control indicator based on setting the bit. In some example implementations, the first reference signal includes a first power ratio and the second reference signal includes a second power ratio. In some examples, a quantity of the set of reference signals is less than or equal to a quantity of antenna ports. In some examples, transmitting the set of reference signals further includes transmitting a power ratio in a reference signal of the set of reference signals.

In other examples, the rank component 1310 may receive, from a UE, an indication of a rank associated with the UE. In some examples, the reference signal component 1315 may transmit, to the UE, a reference signal associated with a set of reference signal ports based on receiving the indication of the rank. The antenna ports component 1345 may configure a group of antenna ports based on the set of reference signal ports. In some examples, the communication component 1320 may communicate, with the UE, based on determining the group of antenna ports.

In some examples, the rank component 1310 may determining the rank associated with the UE based on the indication of the rank associated with the UE. In some implementations, transmitting the reference signal is based on determining the rank associated with the UE. In some examples, the rank component 1310 may determine that the rank associated with the UE is greater than a threshold. In an example implementation, transmitting the reference signal is further based on determining that the rank associated with the UE is greater than the threshold.

In some examples, the reference signal component 1315 may configure the set of reference signal ports to be quasi co-located for one or more parameters, in which communicating with the UE is based on configuring the set of reference signal ports to be quasi co-located. In some examples, the reference signal component 1315 may configure the set of reference signal ports to be quasi co-located based on a quasi co-location type. In some implementations, communicating with the UE is based on configuring the set of reference signal ports to be quasi co-located. In some implementations, the one or more parameters include one or more of a doppler shift, a doppler spread, an average delay, or a delay spread. In some examples, the one or more parameters are different than an average gain.

In some examples, the antenna ports component 1345 may configure the group of antenna ports and each of the set of reference signal ports to be quasi co-located for one or more parameters, in which communicating with the UE is based on configuring the group of antenna ports and each of the set of reference signal ports to be quasi co-located. In some implementations, the one or more parameters include an average gain. In some examples, the reference signal is an aperiodic reference signal. In some examples, one or more reference signals include one or more of a tracking reference signal.

In other examples, the rank component 1310 may receive, from a UE, an indication of a rank associated with the UE. In some examples, the reference signal component 1315 may transmit, to the UE, a reference signal associated with a set of power ratios based on receiving the indication of the rank, in which each of the set of power ratios is associated with a respective group of antenna ports. In some examples, the communication component 1320 may communicate, with the UE, based on transmitting the reference signal associated with a set of power ratios.

The power ratio component 1325 may configure a first power ratio associated with a first group of antenna ports based on the reference signal. In some examples, the power ratio component 1325 may configure a second power ratio associated with a second group of antenna ports based on the reference signal. In some examples, the first power ratio and the second power ratio are included in the set of power ratios, and the first group of antenna ports is different than the second group of antenna ports. In some examples, the power ratio component 1325 may configure a second power ratio associated with a second group of antenna ports based on the reference signal, in which the second group of antenna ports is a subset of the first group of antenna ports.

In some examples, the power ratio component 1325 may configure the second power ratio based on the first power ratio. The range component 1350 may configure a first range associated with the first power ratio to be different than a second range associated with the second power ratio. In some examples, communicating with the UE is based on the first range associated with the first power ratio and the second range associated with the second power ratio. The scaling factor component 1355 may transmit, to the UE, a configuration message and a control indication indicating a scaling factor associated with a group of antenna ports. In some implementations, transmitting the reference signal is based on the configuration message. In some implementations, the control indication includes one or more of a downlink control indicator or a media access layer control element. In some implementations, the configuration message includes a radio resource control configuration. In some examples, the reference signal component 1315 may transmit the reference signal associated with the set of power ratios is based on determining that the rank associated with the UE is greater than the threshold. In some implementations, the set of reference signals include one or more of a tracking reference signal.

Figure 14:
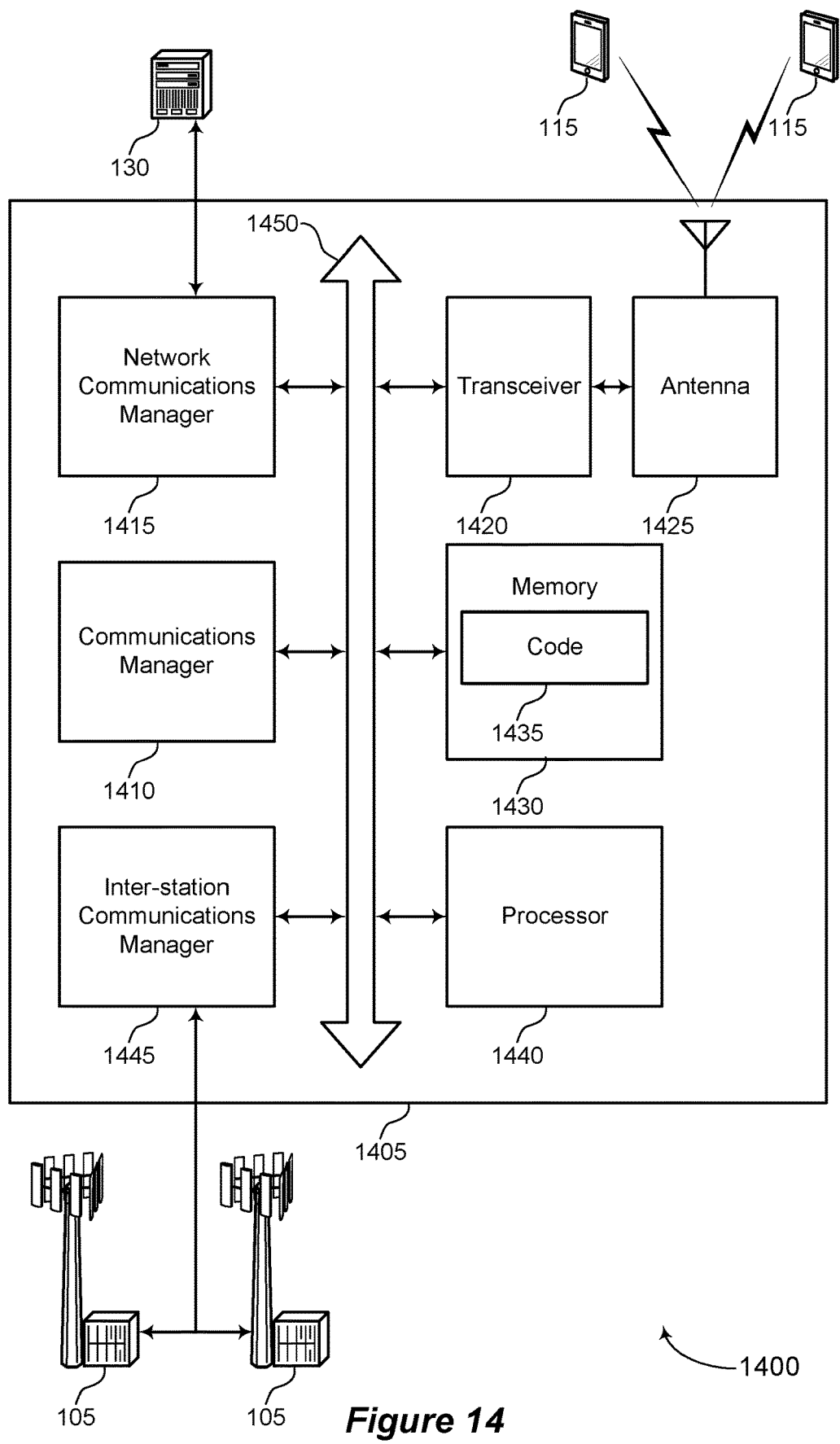
FIG. 14 shows a diagram of a system including a device that supports multiple power references for high rank transmissions in accordance with aspects of the present disclosure.

FIG. 14 shows a diagram of a system 1400 including a device 1405 that supports multiple power references for high rank transmissions in accordance with aspects of the present disclosure. The device 1405 may be an example of or include the components of device 1105, device 1205, or a base station 105 as described with reference to FIG. 1. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (for example, bus 1450).

The communications manager 1410 may receive, from a UE, an indication of a rank associated with the UE, transmit, to the UE, a set of reference signals associated with a PDSCH based on receiving the indication of the rank, in which each of the set of reference signals is associated with a respective group of antenna ports for receiving the PDSCH, and communicate, with the UE, based on transmitting the set of reference signals. In other examples, the communications manager 1410 may receive, from a UE, an indication of a rank associated with the UE, transmit, to the UE, a reference signal associated with a set of reference signal ports based on receiving the indication of the rank, configure a group of antenna ports based on the set of reference signal ports, and communicate, with the UE, based on determining the group of antenna ports. In some other examples, the communications manager 1410 may receive, from a UE, an indication of a rank associated with the UE, transmit, to the UE, a reference signal associated with a set of power ratios based on receiving the indication of the rank, and communicate, with the UE, based on transmitting the reference signal associated with a set of power ratios. In some examples, the set of power ratios is associated with a respective group of antenna ports.

The network communications manager 1415 may manage communications with the core network (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some implementations, the wireless device may include a single antenna 1425 or a set of antennas. However, in some examples the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (for example, the processor 1440) cause the device to perform various functions described herein. In some implementations, the memory 1430 may contain, among other things, a BIOS which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1440 may be configured to operate a memory array using a memory controller. In some implementations, a memory controller may be integrated into processor 1440. The processor 1440 may be configured to execute computer-readable instructions stored in a memory (for example, the memory 1430) to cause the device 1405 to perform various functions (for example, functions or tasks supporting multiple power references for high rank transmissions).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some implementations, the code 1435 may not be directly executable by the processor 1440 but may cause a computer (for example, when compiled and executed) to perform functions described herein.

Figure 15:
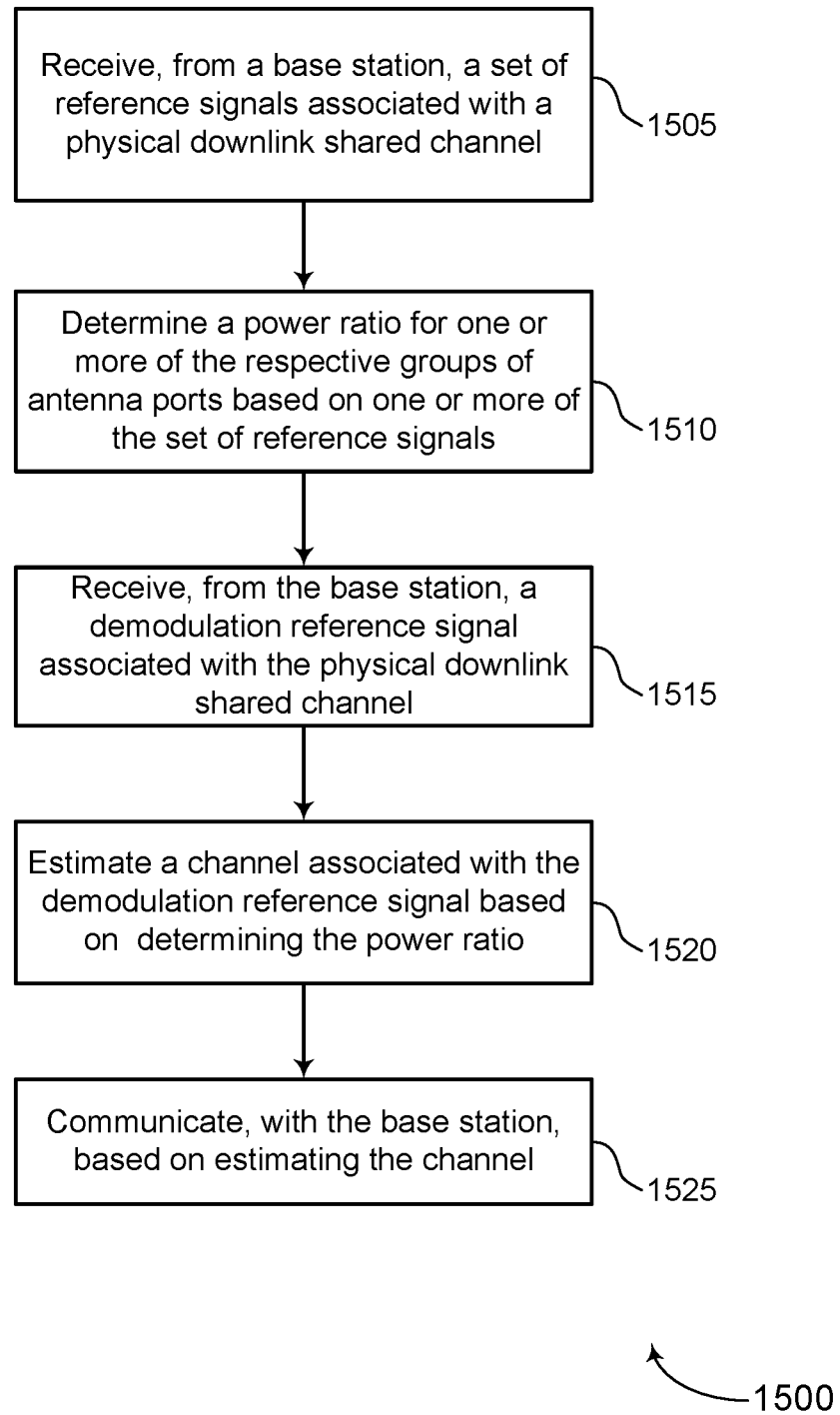
FIGS. 15-20 show flowcharts illustrating methods that support multiple power references for high rank transmissions in accordance with aspects of the present disclosure.

FIG. 15 shows a flowchart illustrating a method 1500 that supports multiple power references for high rank transmissions in accordance with aspects of the present disclosure. The operations of method 1500 may be implemented by a UE 115 or its components. For example, the operations of method 1500 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a set of reference signals associated with a PDSCH. In some implementations, each of the set of reference signals is associated with a respective group of antenna ports for receiving the PDSCH. The operations of 1505 may be performed according to the methods described herein. In some examples, aspects of the operations of 1505 may be performed by a reference signal component as described with reference to FIGS. 7-10.

At 1510, the UE may determine a power ratio for one or more of the respective groups of antenna ports based on one or more of the set of reference signals. In some examples, the UE may receive the power ratio for the one or more of the respective groups of antenna ports from the base station. The operations of 1510 may be performed according to the methods described herein. In some examples, aspects of the operations of 1510 may be performed by a power ratio component as described with reference to FIGS. 7-10.

At 1515, the UE may receive, from the base station, a demodulation reference signal associated with the PDSCH. The operations of 1515 may be performed according to the methods described herein. In some examples, aspects of the operations of 1515 may be performed by a demodulation reference signal component as described with reference to FIGS. 7-10.

At 1520, the UE may estimate a channel associated with the demodulation reference signal based on determining the power ratio. The operations of 1520 may be performed according to the methods described herein. In some examples, aspects of the operations of 1520 may be performed by a channel estimation component as described with reference to FIGS. 7-10.

At 1525, the UE may communicate, with the base station, based on estimating the channel. The operations of 1525 may be performed according to the methods described herein. In some examples, aspects of the operations of 1525 may be performed by a communication component as described with reference to FIGS. 7-10.

Figure 16:
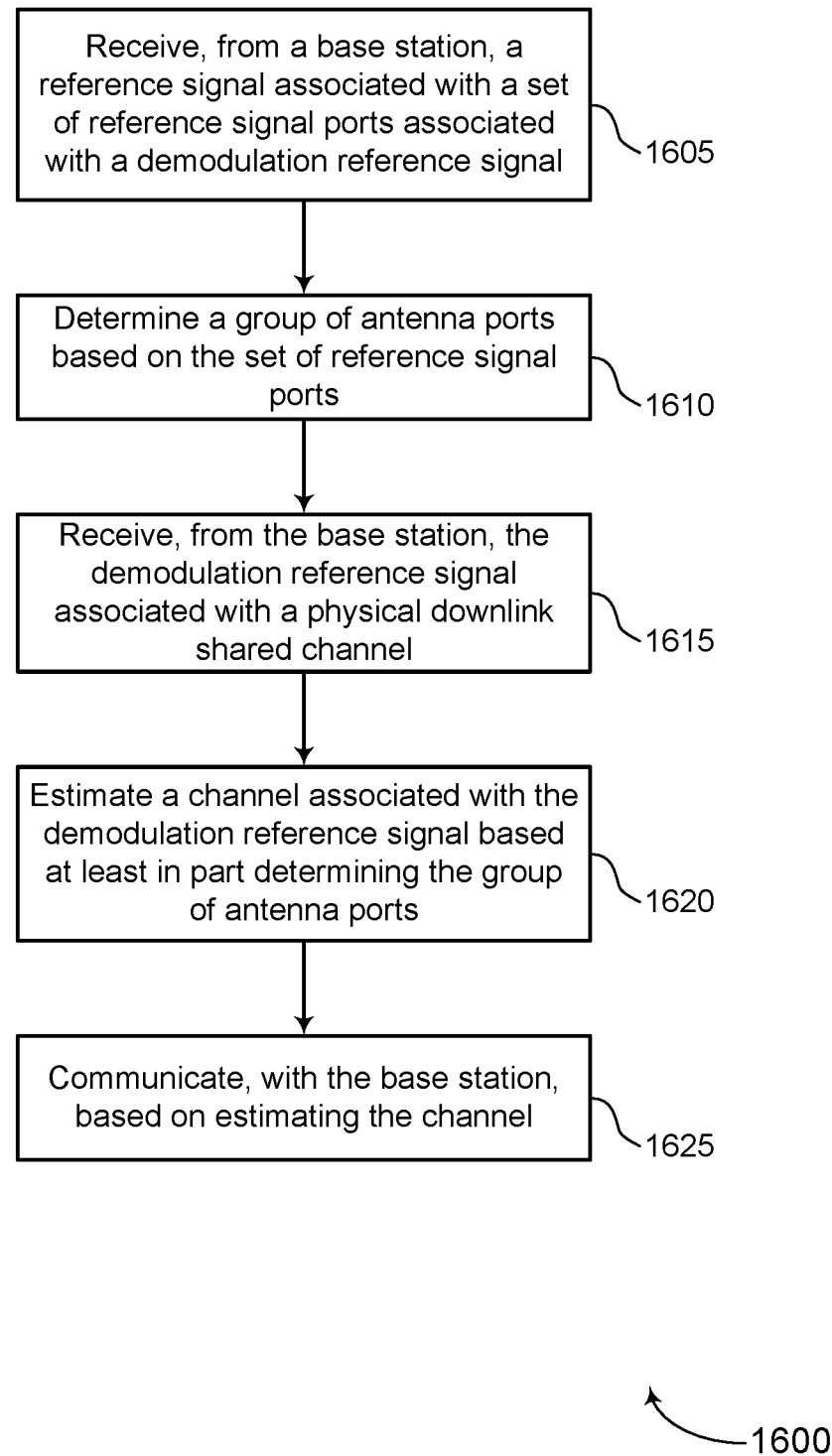

FIG. 16 shows a flowchart illustrating a method 1600 that supports multiple power references for high rank transmissions in accordance with aspects of the present disclosure. The operations of method 1600 may be implemented by a UE 115 or its components. For example, the operations of method 1600 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a reference signal associated with a set of reference signal ports associated with a demodulation reference signal. The operations of 1605 may be performed according to the methods described herein. In some examples, aspects of the operations of 1605 may be performed by a reference signal component as described with reference to FIGS. 7-10.

At 1610, the UE may determine a group of antenna ports based on the set of reference signal ports. The operations of 1610 may be performed according to the methods described herein. In some examples, aspects of the operations of 1610 may be performed by an antenna ports component as described with reference to FIGS. 7-10.

At 1615, the UE may receive, from the base station, the demodulation reference signal associated with a PDSCH. The operations of 1615 may be performed according to the methods described herein. In some examples, aspects of the operations of 1615 may be performed by a demodulation reference signal component as described with reference to FIGS. 7-10.

At 1620, the UE may estimate a channel associated with the demodulation reference signal based on determining the group of antenna ports. The operations of 1620 may be performed according to the methods described herein. In some examples, aspects of the operations of 1620 may be performed by a channel estimation component as described with reference to FIGS. 7-10.

At 1625, the UE may communicate, with the base station, based on estimating the channel. The operations of 1625 may be performed according to the methods described herein. In some examples, aspects of the operations of 1625 may be performed by a communication component as described with reference to FIGS. 7-10.

Figure 17:
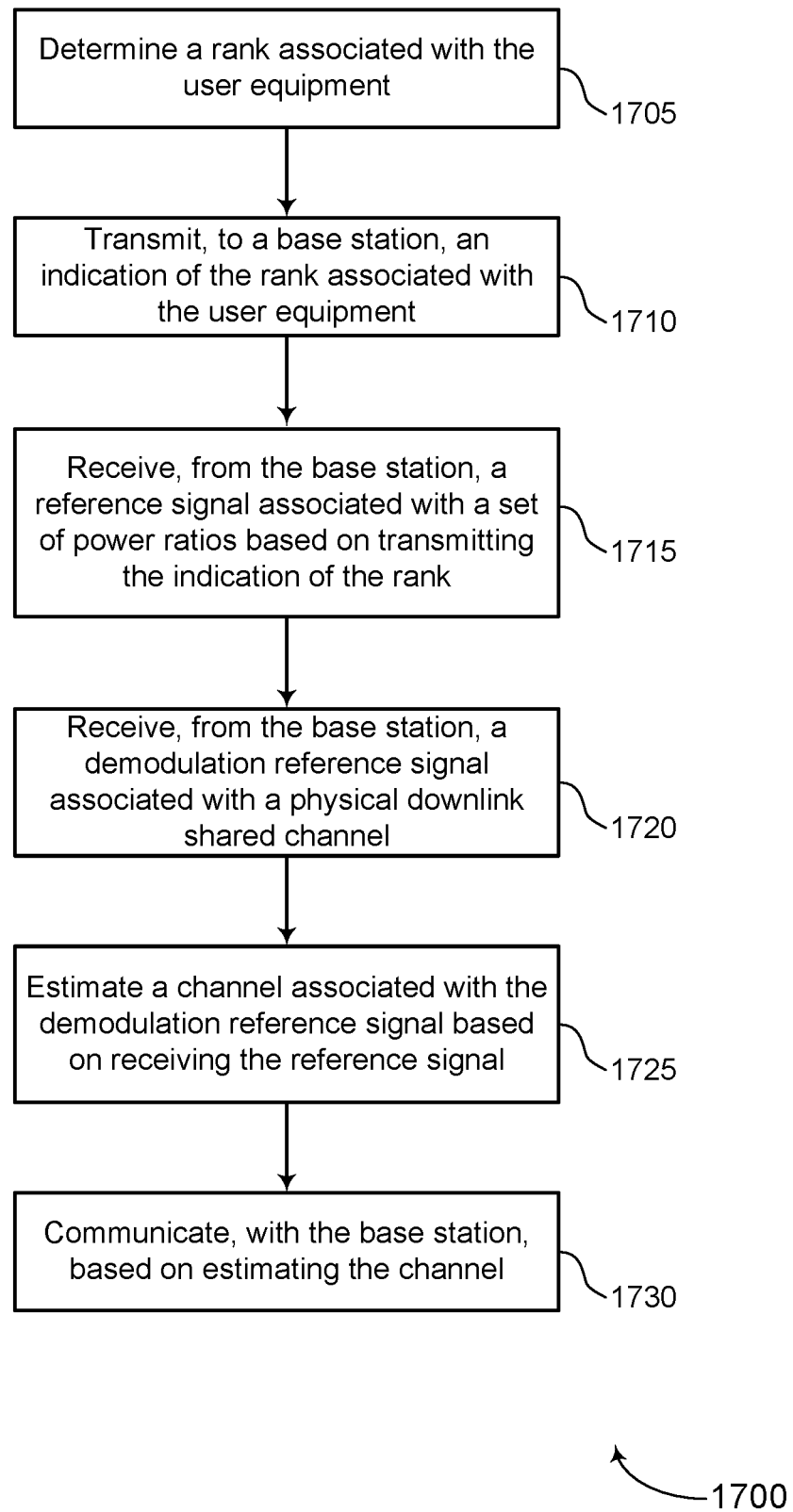

FIG. 17 shows a flowchart illustrating a method 1700 that supports multiple power references for high rank transmissions in accordance with aspects of the present disclosure. The operations of method 1700 may be implemented by a UE 115 or its components. For example, the operations of method 1700 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1705, the UE may determine a rank associated with the UE. The operations of 1705 may be performed according to the methods described herein. In some examples, aspects of the operations of 1705 may be performed by a rank component as described with reference to FIGS. 7-10.

At 1710, the UE may transmit, to a base station, an indication of the rank associated with the UE. The operations of 1710 may be performed according to the methods described herein. In some examples, aspects of the operations of 1710 may be performed by a rank component as described with reference to FIGS. 7-10.

At 1715, the UE may receive, from the base station, a reference signal associated with a set of power ratios based on transmitting the indication of the rank. In some implementations, each of the set of power ratios is associated with a respective group of antenna ports. The operations of 1715 may be performed according to the methods described herein. In some examples, aspects of the operations of 1715 may be performed by a reference signal component as described with reference to FIGS. 7-10.

At 1720, the UE may receive, from the base station, a demodulation reference signal associated with a PDSCH. The operations of 1720 may be performed according to the methods described herein. In some examples, aspects of the operations of 1720 may be performed by a demodulation reference signal component as described with reference to FIGS. 7-10.

At 1725, the UE may estimate a channel associated with the demodulation reference signal based on receiving the reference signal. The operations of 1725 may be performed according to the methods described herein. In some examples, aspects of the operations of 1725 may be performed by a channel estimation component as described with reference to FIGS. 7-10.

At 1730, the UE may communicate, with the base station, based on estimating the channel. The operations of 1730 may be performed according to the methods described herein. In some examples, aspects of the operations of 1730 may be performed by a communication component as described with reference to FIGS. 7-10.

Figure 18:
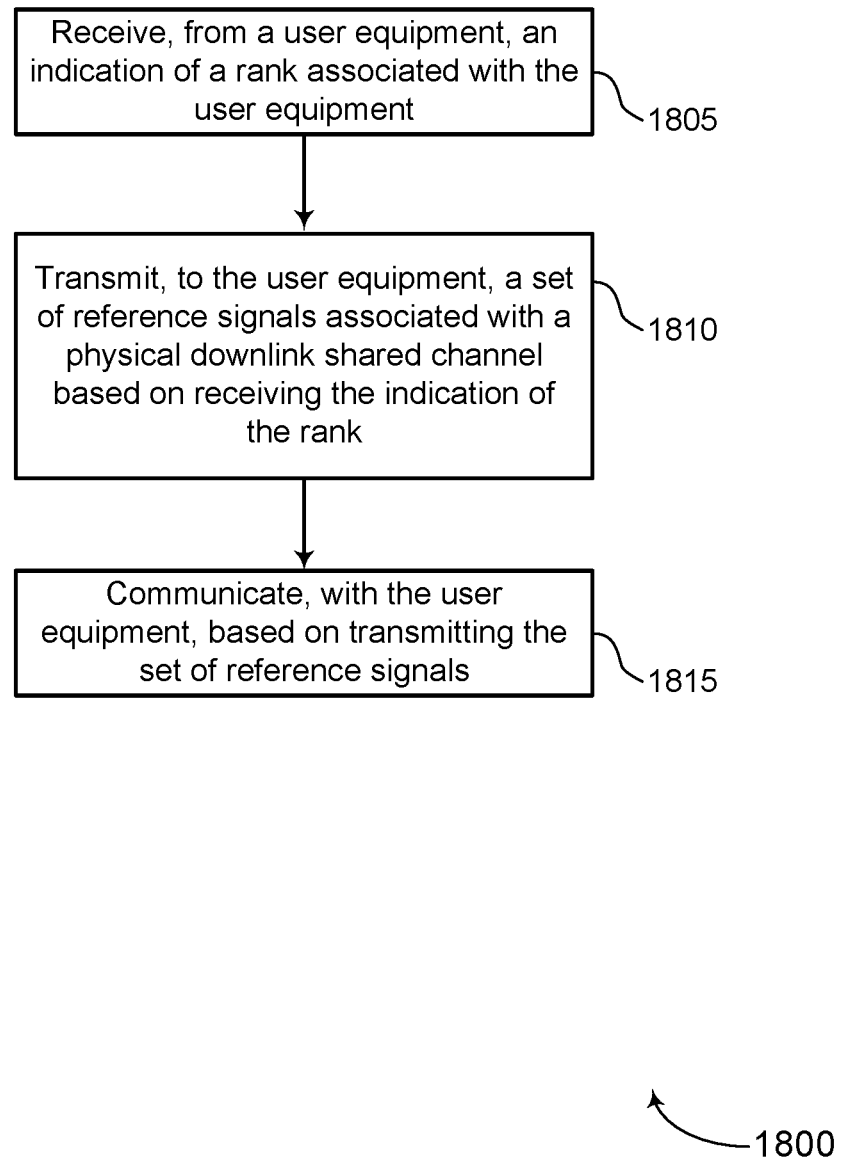

FIG. 18 shows a flowchart illustrating a method 1800 that supports multiple power references for high rank transmissions in accordance with aspects of the present disclosure. The operations of method 1800 may be implemented by a base station 105 or its components. For example, the operations of method 1800 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1805, the base station may receive, from a UE, an indication of a rank associated with the UE. The operations of 1805 may be performed according to the methods described herein. In some examples, aspects of the operations of 1805 may be performed by a rank component as described with reference to FIGS. 11-14.

At 1810, the base station may transmit, to the UE, a set of reference signals associated with a PDSCH based on receiving the indication of the rank. In some implementations, each of the set of reference signals is associated with a respective group of antenna ports for receiving the PDSCH. The operations of 1810 may be performed according to the methods described herein. In some examples, aspects of the operations of 1810 may be performed by a reference signal component as described with reference to FIGS. 11-14.

At 1815, the base station may communicate, with the UE, based on transmitting the set of reference signals. The operations of 1815 may be performed according to the methods described herein. In some examples, aspects of the operations of 1815 may be performed by a communication component as described with reference to FIGS. 11-14.

Figure 19:
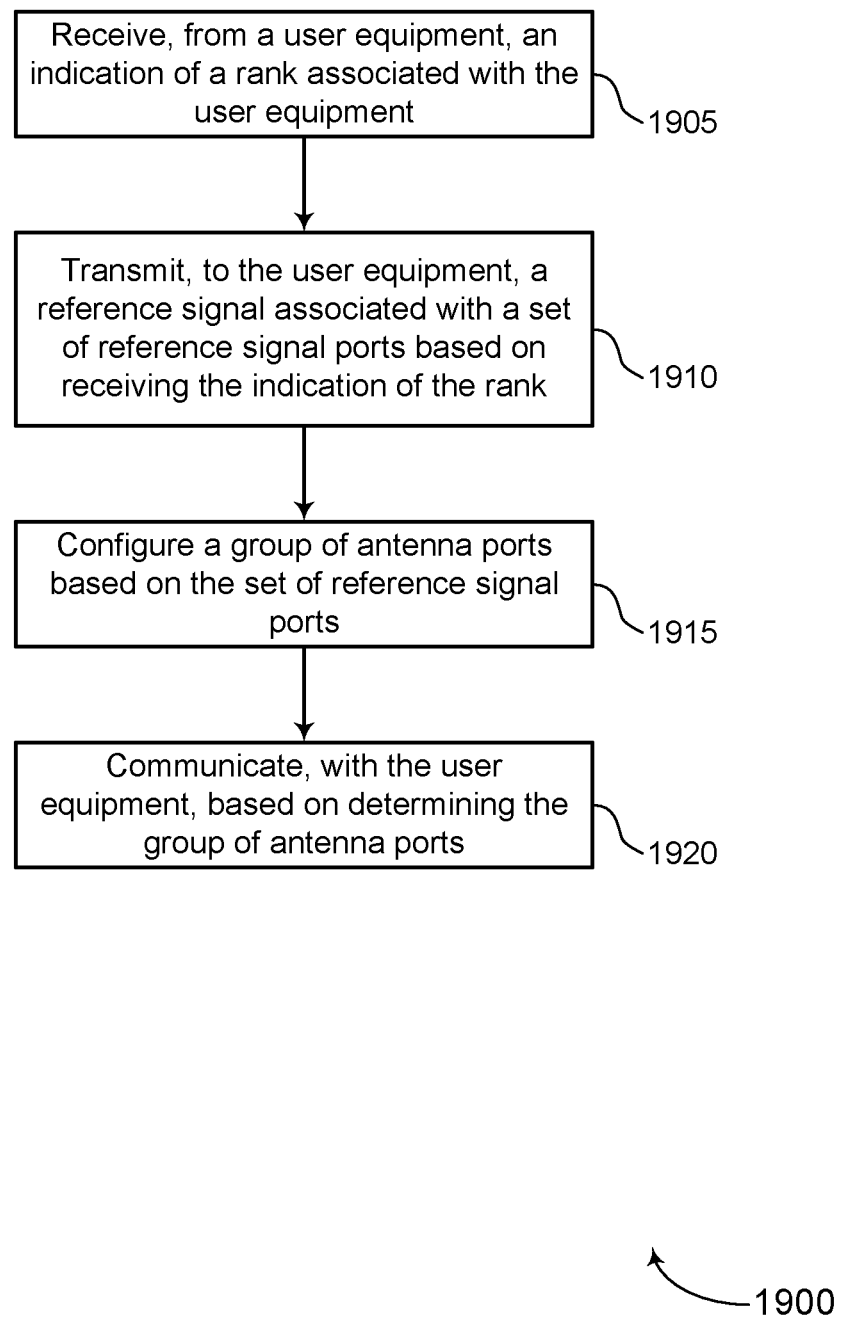

FIG. 19 shows a flowchart illustrating a method 1900 that supports multiple power references for high rank transmissions in accordance with aspects of the present disclosure. The operations of method 1900 may be implemented by a base station 105 or its components. For example, the operations of method 1900 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1905, the base station may receive, from a UE, an indication of a rank associated with the UE. The operations of 1905 may be performed according to the methods described herein. In some examples, aspects of the operations of 1905 may be performed by a rank component as described with reference to FIGS. 11-14.

At 1910, the base station may transmit, to the UE, a reference signal associated with a set of reference signal ports based on receiving the indication of the rank. The operations of 1910 may be performed according to the methods described herein. In some examples, aspects of the operations of 1910 may be performed by a reference signal component as described with reference to FIGS. 11-14.

At 1915, the base station may configure a group of antenna ports based on the set of reference signal ports. The operations of 1915 may be performed according to the methods described herein. In some examples, aspects of the operations of 1915 may be performed by an antenna ports component as described with reference to FIGS. 11-14.

At 1920, the base station may communicate, with the UE, based on determining the group of antenna ports. The operations of 1920 may be performed according to the methods described herein. In some examples, aspects of the operations of 1920 may be performed by a communication component as described with reference to FIGS. 11-14.

Figure 20:
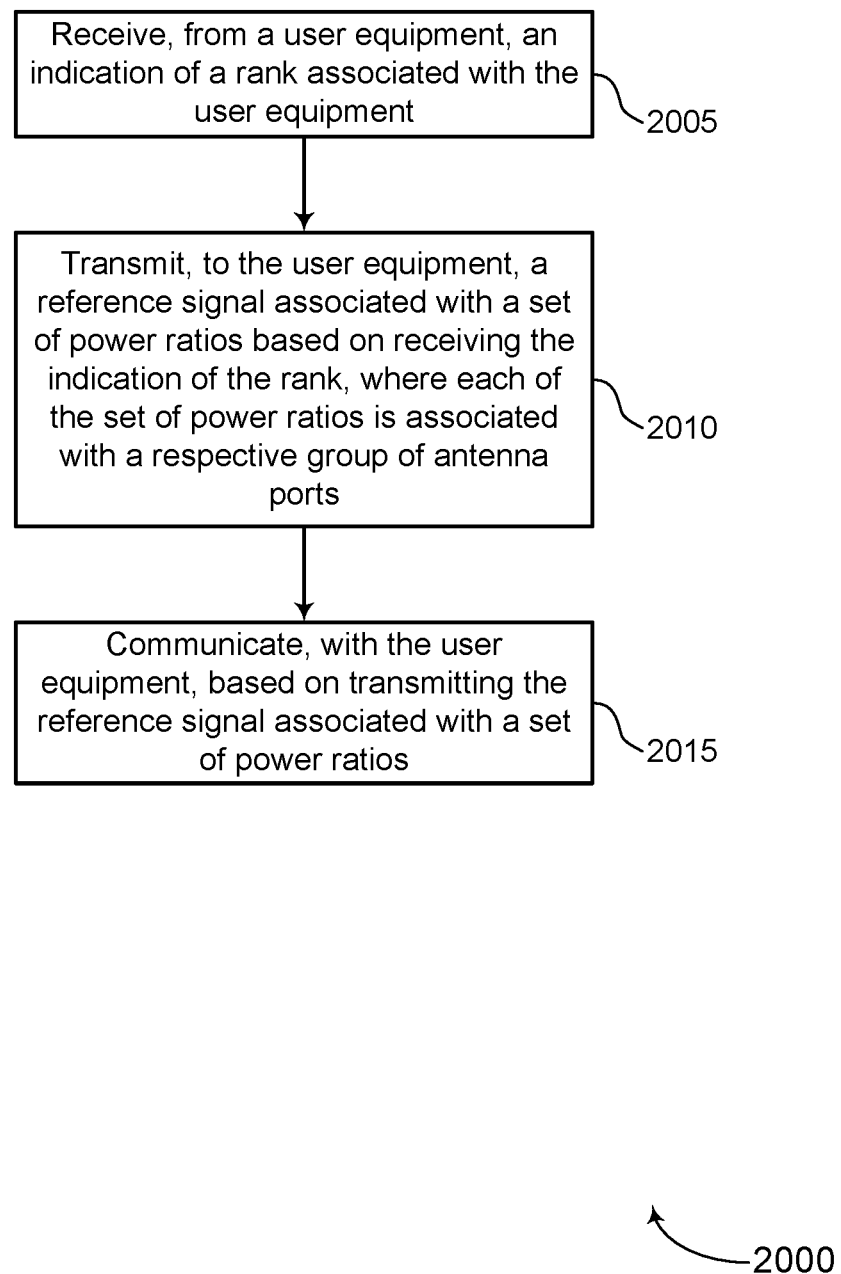

FIG. 20 shows a flowchart illustrating a method 2000 that supports multiple power references for high rank transmissions in accordance with aspects of the present disclosure. The operations of method 2000 may be implemented by a base station 105 or its components. For example, the operations of method 2000 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, an indication of a rank associated with the UE. The operations of 2005 may be performed according to the methods described herein. In some examples, aspects of the operations of 2005 may be performed by a rank component as described with reference to FIGS. 11-14.

At 2010, the base station may transmit, to the UE, a reference signal associated with a set of power ratios based on receiving the indication of the rank, in which each of the set of power ratios is associated with a respective group of antenna ports. The operations of 2010 may be performed according to the methods described herein. In some examples, aspects of the operations of 2010 may be performed by a reference signal component as described with reference to FIGS. 11-14.

At 2015, the base station may communicate, with the UE, based on transmitting the reference signal associated with a set of power ratios. The operations of 2015 may be performed according to the methods described herein. In some examples, aspects of the operations of 2015 may be performed by a communication component as described with reference to FIGS. 11-14.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA). CDMA2000 covers IS-2000, IS-95, and IS-856 standards. IS-2000 Releases may be commonly referred to as CDMA2000 1x, 1X. IS-856 (TIA-856) is commonly referred to as CDMA2000 1xEV-DO, High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (for example, two, three, four, among other examples) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" will not be construed as a reference to a closed set of conditions. For example, an operation that is described as "based on condition A" may be based on both a condition A and a condition B without departing from the scope of the present disclosure. In other words, as used herein, the phrase "based on" will be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
   receiving, from a base station, a plurality of reference signals associated with a physical downlink shared channel, wherein each of the plurality of reference signals is associated with a respective group of antenna ports for receiving the physical downlink shared channel, and wherein the plurality of reference signals are associated with a same physical downlink shared channel and a single frequency network configuration;
   determining a power ratio for one or more of the respective groups of antenna ports based at least in part on one or more of the plurality of reference signals;
   receiving, from the base station, a demodulation reference signal associated with the physical downlink shared channel;
   estimating a channel associated with the demodulation reference signal based at least in part on determining the power ratio; and
   communicating, with the base station, based at least in part on estimating the channel.

2. The method of claim 1, wherein receiving the plurality of reference signals further comprises receiving a first reference signal associated with the physical downlink shared channel and a second reference signal associated with the physical downlink shared channel, wherein the first reference signal is quasi co-located with the second reference signal.

3. The method of claim 1, wherein determining the power ratio further comprises:
   determining a first energy of each resource element associated with the physical downlink shared channel;
   determining a second energy of each resource element associated with one or more reference signals of the plurality of reference signals; and
   determining a ratio between the first energy of each resource element and the second energy of each resource element.

4. The method of claim 1, further comprising:
   determining a rank associated with the user equipment; and
   transmitting, to the base station, an indication of the rank associated with the user equipment, wherein receiving the plurality of reference signals is further based at least in part on transmitting the indication of the rank.

5. The method of claim 1, further comprising determining that a rank associated with the user equipment is greater than a threshold, wherein receiving the plurality of reference signals is further based at least in part on determining that the rank associated with the user equipment is greater than the threshold.

6. The method of claim 1, further comprising:
   determining that a first reference signal and a second reference signal are quasi co-located for one or more parameters based at least in part on a source identifier, wherein receiving the plurality of reference signals further comprises receiving the first reference signal associated with the physical downlink shared channel and the second reference signal associated with the physical downlink shared channel.

7. The method of claim 6, further comprising receiving one or more resources associated with the first reference signal and one or more resources associated with the second reference signal on the same symbol.

8. The method of claim 6, wherein the one or more parameters comprise one or more of a doppler shift, a doppler spread, an average delay, or a delay spread.

9. The method of claim 6, wherein the source identifier comprises one or more of a synchronization signal block identifier or a quasi co-location identifier configured by the base station using a radio resource control configuration.

10. The method of claim 1, further comprising determining one or more antenna ports for receiving the demodulation reference signal based at least in part on the received plurality of reference signals.

11. The method of claim 1, wherein a first reference signal of the plurality of reference signals comprises a periodic reference signal and a second reference signal of the plurality of reference signals comprises an aperiodic reference signal.

12. The method of claim 11, further comprising:
receiving, from the base station, a downlink control indicator; and
identifying a bit included in the downlink control indicator, wherein receiving the second reference signal is based at least in part on identifying the bit included in the downlink control indicator.

13. The method of claim 11, wherein the second reference signal comprises a second power ratio.

14. The method of claim 1, wherein a quantity of the plurality of reference signals is less than or equal to a quantity of antenna ports.

15. The method of claim 1, wherein receiving the plurality of reference signals further comprises receiving the power ratio in one or more reference signals of the plurality of reference signals, wherein determining the power ratio for one or more of the respective groups of antenna ports is based at least in part on receiving the power ratio in the one or more reference signals.

16. The method of claim 1, wherein determining the power ratio for one or more of the respective groups of antenna ports further comprises determining the power ratio for each of the respective groups of antenna ports.

17. The method of claim 1, wherein one or more reference signals comprise one or more of a tracking reference signal.

18. The method of claim 1, wherein the single frequency network configuration indicates that each of the plurality of reference signals are associated with the same physical downlink shared channel.

19. The method of claim 1, wherein communicating with the base station comprises:
transmitting a message to the base station based at least in part on estimating the channel, wherein a rank associated with the message is greater than a threshold.

20. A method for wireless communication at a base station, comprising:
receiving, from a user equipment, an indication of a rank associated with the user equipment;
transmitting, to the user equipment, a plurality of reference signals associated with a physical downlink shared channel based at least in part on receiving the indication of the rank, wherein each of the plurality of reference signals is associated with a respective group of antenna ports for receiving the physical downlink shared channel; and
communicating, with the user equipment, based at least in part on transmitting the plurality of reference signals.

21. The method of claim 20, wherein transmitting the plurality of reference signals further comprises transmitting a first reference signal associated with the physical downlink shared channel and a second reference signal associated with the physical downlink shared channel, wherein the first reference signal is quasi co-located with the second reference signal.

22. The method of claim 20, further comprising determining that the rank associated with the user equipment is greater than a threshold, wherein transmitting the plurality of reference signals is further based at least in part on determining that the rank associated with the user equipment is greater than the threshold.

23. The method of claim 20, wherein a reference signal of the plurality of reference signals includes a power ratio for one or more of the respective groups of antenna ports.

24. The method of claim 20, wherein transmitting the plurality of reference signals further comprises transmitting a first reference signal associated with the physical downlink shared channel and a second reference signal associated with the physical downlink shared channel, wherein the first reference signal and the second reference signal are quasi co-located for one or more parameters based at least in part on a source identifier.

25. The method of claim 24, further comprising transmitting one or more resources associated with the first reference signal and one or more resources associated with the second reference signal on the same symbol, wherein communicating with the user equipment is based at least in part on transmitting the one or more resources.

26. The method of claim 20, wherein a first reference signal of the plurality of reference signals comprises a periodic reference signal and a second reference signal of the plurality of reference signals comprises an aperiodic reference signal, the method further comprising:
setting a bit included in a downlink control indicator to indicate one or more resources associated with the second reference signal; and
transmitting, to the user equipment, the downlink control indicator based at least in part on setting the bit.

27. An apparatus for wireless communication at a user equipment, comprising:
a processor,
memory in electronic communication with the processor; and
instructions stored in the memory and executable by the processor to cause the apparatus to:
receive, from a base station, a plurality of reference signals associated with a physical downlink shared channel, wherein each of the plurality of reference signals is associated with a respective group of antenna ports for receiving the physical downlink shared channel, and wherein the plurality of reference signals are associated with a same physical downlink shared channel and a single frequency network configuration;
determine a power ratio for one or more of the respective groups of antenna ports based at least in part on one or more of the plurality of reference signals;
receive, from the base station, a demodulation reference signal associated with the physical downlink shared channel;
estimate a channel associated with the demodulation reference signal based at least in part on determining the power ratio; and
communicate, with the base station, based at least in part on estimating the channel.

28. The apparatus of claim 27, wherein receiving the plurality of reference signals further comprises receiving a first reference signal associated with the physical downlink shared channel and a second reference signal associated with the physical downlink shared channel, wherein the first reference signal is quasi co-located with the second reference signal.

29. An apparatus for wireless communication at a base station, comprising:
a processor,
memory in electronic communication with the processor; and
instructions stored in the memory and executable by the processor to cause the apparatus to:
receive, from a user equipment, an indication of a rank associated with the user equipment;
transmit, to the user equipment, a plurality of reference signals associated with a physical downlink shared channel based at least in part on receiving the indication of the rank, wherein each of the plurality of reference signals is associated with a respective group of antenna ports for receiving the physical downlink shared channel; and
communicate, with the user equipment, based at least in part on transmitting the plurality of reference signals.

30. The apparatus of claim 29, wherein transmitting the plurality of reference signals further comprises transmitting a first reference signal associated with the physical downlink shared channel and a second reference signal associated with the physical downlink shared channel, wherein the first reference signal is quasi co-located with the second reference signal.

\* \* \* \* \*